（12） United States Patent
Mitsumoto

(10) Patent No.: US 10,688,976 B2
(45) Date of Patent: Jun. 23, 2020

(54) LANE DEPARTURE PREVENTION SYSTEM OF VEHICLE

(71) Applicant: TOYOTA JIDOSHA KABUSHIKI KAISHA, Toyota-shi, Aichi-ken (JP)

(72) Inventor: Hisanori Mitsumoto, Gotenba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 81 days.

(21) Appl. No.: 15/792,149

(22) Filed: Oct. 24, 2017

(65) Prior Publication Data

US 2018/0134267 A1   May 17, 2018

(30) Foreign Application Priority Data

Nov. 11, 2016   (JP) ................... 2016-220707

(51) Int. Cl.
| B60T 8/00 | (2006.01) |
| B60T 8/1755 | (2006.01) |
| B60W 30/02 | (2012.01) |
| B60W 30/12 | (2020.01) |
| B60T 7/12 | (2006.01) |

(Continued)

(52) U.S. Cl.
CPC ............ *B60T 8/17552* (2013.01); *B60T 7/12* (2013.01); *B60T 8/00* (2013.01); *B60T 8/171* (2013.01); *B60T 8/17557* (2013.01); *B60T 8/58* (2013.01); *B60W 30/02* (2013.01); *B60W 30/12* (2013.01); *B60T 2201/083* (2013.01); *B60T 2250/03* (2013.01); *B60W 2520/10* (2013.01); *B60W 2520/14* (2013.01); *B60W 2520/20* (2013.01); *B60W 2540/18* (2013.01);
(Continued)

(58) Field of Classification Search
None
See application file for complete search history.

(56) References Cited

U.S. PATENT DOCUMENTS

| 2002/0082762 A1* | 6/2002 | Tanaka .................. B60T 8/1755 701/70 |
| 2005/0012389 A1* | 1/2005 | Kato ..................... B60T 8/1755 303/146 |

(Continued)

FOREIGN PATENT DOCUMENTS

| CN | 1616283 A | 5/2005 |
| CN | 104703854 A | 6/2015 |

(Continued)

*Primary Examiner* — Truc M Do
(74) *Attorney, Agent, or Firm* — Oliff PLC

(57) ABSTRACT

A lane departure prevention system includes a controller configured to control a braking force of vehicle wheels such that a lane departure prevention yaw moment is applied to a vehicle. The controller determines whether there is a likelihood that the vehicle enters a spinning state based on at least one of a difference between an actual yaw rate and a normative yaw rate of the vehicle calculated based on a steering angle, a vehicle speed, and the lane departure prevention yaw moment, and a degree of braking slip of a turning inside wheel when the lane departure prevention yaw moment is a yaw moment for preventing departure of the vehicle from a lane to a turning outside, and applies a spin prevention yaw moment to the vehicle when it is determined that there is a likelihood that the vehicle will enter the spinning state.

9 Claims, 8 Drawing Sheets

(51) Int. Cl.
*B60T 8/171* (2006.01)
*B60T 8/58* (2006.01)

(52) U.S. Cl.
CPC ..... *B60W 2710/18* (2013.01); *B60W 2720/14* (2013.01); *B60W 2720/406* (2013.01)

(56) References Cited

U.S. PATENT DOCUMENTS

| | | | | |
|---|---|---|---|---|
| 2005/0107939 A1* | 5/2005 | Sadano | ............... | B60T 8/17557 701/70 |
| 2007/0067085 A1* | 3/2007 | Lu | ............... | B60T 8/172 701/70 |
| 2010/0295707 A1* | 11/2010 | Bennie | ............... | B60W 40/09 340/988 |
| 2011/0153177 A1* | 6/2011 | Mahlenbrey | ............... | B60T 8/36 701/70 |
| 2011/0251748 A1* | 10/2011 | Moran | ............... | B60T 8/1755 701/31.4 |
| 2011/0251749 A1* | 10/2011 | Schwarz | ............... | B60T 7/12 701/31.4 |
| 2011/0276227 A1* | 11/2011 | Sugawara | ............... | B60T 7/042 701/41 |
| 2015/0116114 A1* | 4/2015 | Boyles | ............... | G08B 25/00 340/539.17 |
| 2015/0239442 A1* | 8/2015 | Yamakado | ............... | B60L 3/102 701/70 |
| 2015/0298694 A1* | 10/2015 | Park | ............... | B60W 30/12 701/41 |

FOREIGN PATENT DOCUMENTS

| | | |
|---|---|---|
| JP | 2001-310719 A | 11/2001 |
| JP | 2006-282168 A | 10/2006 |
| JP | 2010-102435 A | 5/2010 |

* cited by examiner

LANE DEPARTURE PREVENTION SYSTEM OF VEHICLE

INCORPORATION BY REFERENCE

The disclosure of Japanese Patent Application No. 2016-220707 filed on Nov. 11, 2016 including the specification, drawings and abstract is incorporated herein by reference in its entirety.

BACKGROUND

1. Technical Field

The disclosure relates to a lane departure prevention system of a vehicle such as an automobile.

2. Description of Related Art

A lane departure prevention system configured to generate a lane departure prevention yaw moment for preventing a vehicle from departing from a traveling lane using a braking force difference between right and left wheels when it is determined that there is concern that the vehicle will depart from the traveling lane based on a positional relationship of the vehicle relative to the traveling lane has already been practically implemented. An example of the lane departure prevention system is described in Japanese Patent Application Publication No. 2006-282168 (JP 2006-282168 A).

SUMMARY

When there is a likelihood that a vehicle will depart from a traveling lane to a turning outside, a lane departure prevention yaw moment in a direction in which a turning radius of the vehicle decreases is applied to the vehicle by applying a braking force to a turning inside wheel. When there is a likelihood that a vehicle will depart from a traveling lane to a turning outside and a braking force is applied to the turning inside wheel in a situation in which the vehicle travels on a road of which a road surface has a low frictional coefficient (hereinafter referred to as a "low-µ road"), a lateral force of the turning inside wheel may be insufficient due to a decrease in the lateral force of the turning inside wheel and traveling of the vehicle may be destabilized. Particularly, when the lateral force of the turning inside rear Wheel is insufficient, there is concern that the vehicle may exhibit over-steering behavior and enter a spinning state.

When there is concern that the vehicle will depart from the lane to the turning inside, a lane departure prevention yaw moment in a direction in which the turning radius of the vehicle increases is applied to the vehicle by applying a braking force to a turning outside wheel. Accordingly, since a centrifugal force acting on the vehicle decreases, the vehicle does not enter a spinning state due to insufficiency of the lateral force of the turning outside rear wheel even when the braking force is applied to the turning outside wheels.

A behavior control device configured to control a braking force based on spin control of reducing a spinning state when the vehicle enters a spinning state is known, but the control of a braking force based on spin control is not performed unless an index value indicating the spinning state of the vehicle is equal to or greater than a reference value. Accordingly, even with the vehicle having the behavior control device mounted therein, it is not possible to effectively reduce concern that the vehicle will enter a spinning state due to application of a lane departure prevention yaw moment to the vehicle and insufficiency of the lateral force of the turning inside rear wheel in a situation in which there is concern that the vehicle will depart from the traveling lane to the turning outside.

The disclosure provides a braking force control type lane departure prevention system that can apply a braking force to turning inside wheels to prevent a vehicle from departing from a lane to a turning outside and effectively reduce concern that the vehicle will enter a spinning state due to insufficiency of a lateral force of a turning inside rear wheel.

According to an aspect of the disclosure, there is provided a lane departure prevention system of a vehicle. A lane departure prevention system of a vehicle, according to the aspect of the disclosure includes: a detection sensor configured to detect a positional relationship of the vehicle relative to a lane; an actuator: and at least one electronic control unit configured to control a braking force of vehicle wheels by driving the actuator such that a lane departure prevention yaw moment in a direction in which departure from the lane is prevented is applied to the vehicle when it is determined that there is a likelihood that the vehicle departs from the lane based on a detection result of the detection sensor. The at least one electronic control unit is configured to: determine whether there is a likelihood that the vehicle enters a spinning state based on at least one of a difference between an actual turning state quantity and a normative turning state quantity of the vehicle and a degree of braking slip of a turning inside wheel when the lane departure prevention yaw moment is a yaw moment for preventing departure of the vehicle from the lane and a braking force is applied to the turning inside wheel, the normative turning state quantity being calculated based on a steering angle, a vehicle speed, and the lane departure prevention yaw moment; and apply a spin prevention yaw moment, instead of the lane departure prevention yaw moment, to the vehicle by applying a braking force to a turning outside wheel until a predetermined end condition is satisfied when it is determined that there is the likelihood that the vehicle enters the spinning state.

According to the aspect, when the lane departure prevention yaw moment is a yaw moment for preventing departure of the vehicle from the lane to the turning outside and a braking force is applied to the turning inside wheel, it is determined that there is a likelihood that the vehicle will enter a spinning state. When it is determined that there is a likelihood that the vehicle will enter a spinning state, the spin prevention yaw moment instead of the lane departure prevention yaw moment is applied to the vehicle by applying a braking force to the turning outside wheel until the predetermined end condition is satisfied. Accordingly, for example, in a situation in which the vehicle turns on a low-µ road, a yaw moment for preventing departure of the vehicle from the lane to the turning outside is applied to the vehicle and it is thus possible to prevent the vehicle from entering a spinning state by the spin prevention yaw moment even when there is a likelihood that the vehicle will enter a spinning state.

When there is a likelihood that the vehicle will enter the spinning state in a situation in which a braking force is applied to the turning inside wheel, a difference between the actual turning state quantity and the normative turning state quantity of the vehicle increases and the degree of braking slip of the turning inside wheel increases. According to this configuration, since it is determined whether there is a likelihood that the vehicle will enter the spinning state based on at least one of the difference between the actual turning state quantity and the phase-compensated normative turning state quantity of the vehicle and the degree of braking slip of the turning inside wheel, it is possible to determine that there is a likelihood that the vehicle will enter the spinning state when there is a likelihood that the vehicle will enter the spinning state.

The normative turning state quantity which is used to determine whether there is a likelihood that the vehicle will enter the spinning state is a normative turning state quantity of the vehicle which is calculated based on the steering angle, the vehicle speed, and the lane departure prevention yaw moment. Accordingly, in comparison with a case in which the normative turning state quantity is a normative turning state quantity of the vehicle calculated based on only the steering angle and the vehicle speed, it is possible to accurately determine whether there is a likelihood that the vehicle will enter the spinning state in a situation in which the lane departure prevention yaw moment is applied to the vehicle.

In the aspect, the at least one electronic control unit may be configured to: calculate a target lane departure prevention yaw moment for preventing the vehicle from departing from the lane to a turning outside when it is determined that there is the likelihood that the vehicle departs from the lane to the turning outside; calculate a target spin prevention yaw moment for preventing the vehicle from entering the spinning state when it is determined that there is the likelihood that the vehicle enters the spinning state; and control the spin prevention yaw moment based on the target spin prevention yaw moment without determining which magnitude of the target lane departure prevention yaw moment and the target spin prevention yaw moment is greater.

According to the aspect, when it is determined that there is a likelihood that the vehicle will enter the spinning state, the spin prevention yaw moment can be applied to the vehicle without determining Which magnitude of the target lane departure prevention yaw moment and the target spin prevention yaw moment is larger. Accordingly, even when the magnitude of the target spin prevention yaw moment is smaller than the magnitude of the target lane departure prevention yaw moment, it is possible to satisfactorily apply the spin prevention yaw moment to the vehicle.

In the above aspect, the at least one electronic control unit may be configured to determine that there is the likelihood that the vehicle enters the spinning state when it is determined that there is the likelihood that the vehicle enters the spinning state using at least one of: a difference between an actual yaw rate detected by a yaw rate sensor mounted in the vehicle and a normative yaw rate of the vehicle; a difference between an actual lateral acceleration detected by a lateral acceleration sensor mounted in the vehicle and a normative lateral acceleration of the vehicle; a difference between an actual slip angle, which is estimated based on an actual vehicle speed detected by a vehicle speed sensor mounted in the vehicle, the actual yaw rate, and the actual lateral acceleration, and a normative slip angle of the vehicle; a difference between a rate of change of the actual yaw rate detected by the yaw rate sensor and a rate of change of the normative yaw rate of the vehicle; and a difference between a rate of change of the actual lateral acceleration detected by the lateral acceleration sensor and a rate of change of the normative lateral acceleration of the vehicle.

According to this configuration, in a comparison with a case in which whether there is a likelihood that the vehicle will enter the spinning state is determined, for example, based on only one of the differences, it is possible to reduce a likelihood that it is determined that there is no likelihood that the vehicle will enter the spinning state even when there is a likelihood that the vehicle will enter the spinning state.

In the aspect, the at least one electronic control unit may be configured to determine a magnitude of the target spin prevention yaw moment based on the magnitude of the target lane departure prevention yaw moment at a time point at which a determination result that there is no likelihood that the vehicle enters the spinning state is changed to a determination result that there is the likelihood that the vehicle enters the spinning state.

According to this configuration, the magnitude of the target spin prevention yaw moment is determined based on the magnitude of the target lane departure prevention yaw moment at a time point at which the determination result that there is no likelihood that the vehicle will enter the spinning state is changed to the determination result that there is a likelihood that the vehicle will enter the spinning state. Accordingly, it is possible to control the magnitude of the spin prevention yaw moment based on the magnitude of the lane departure prevention yaw moment at the time point at which the determination result that there is no likelihood that the vehicle will enter the spinning state is changed to the determination result that there is a likelihood that the vehicle will enter the spinning state.

In the aspect, the at least one electronic control unit may be configured to: calculate a target yaw rate of the vehicle based on the steering angle and the vehicle speed; and calculate the target spin prevention yaw moment based on a difference between the target yaw rate and an actual yaw rate detected by a yaw rate sensor mounted in the vehicle.

According to this configuration, the target spin prevention yaw moment is calculated based on the difference between the target yaw rate and the actual yaw rate. Accordingly, it is possible to control the spin prevention yaw moment based on the difference between the target yaw rate and the actual yaw rate. The target yaw rate may be calculated in any way known in the art.

In the aspect, the at least one electronic control unit may be configured to: calculate a target lateral acceleration of the vehicle based on the steering angle and the vehicle speed; and calculate the target spin prevention yaw moment based on a difference between the target lateral acceleration and an actual lateral acceleration detected by a lateral acceleration sensor mounted in the vehicle.

According to this configuration, the target spin prevention yaw moment is calculated based on the difference between the target lateral acceleration and the actual lateral acceleration. Accordingly, it is possible to control the spin prevention yaw moment based on the difference between the target lateral acceleration and the actual lateral acceleration. The target lateral acceleration may be calculated in any way known in the art.

In the aspect, the at least one electronic control unit may be configured to: calculate a target yaw rate of the vehicle based on the steering angle and the vehicle speed; and determine that the predetermined end condition is satisfied when a magnitude of an actual yaw rate detected by a yaw rate sensor mounted in the vehicle is equal to or less than the magnitude of the target yaw rate.

According to the aspect, when the magnitude of the actual yaw rate is equal to or less than the magnitude of the target yaw rate, it is determined that the predetermined end condition is satisfied. Accordingly, the spin prevention yaw moment can be applied to the vehicle until the magnitude of the actual yaw rate is equal to or less than the magnitude of the target yaw rate.

In the aspect, the at least one electronic control unit may be configured to: calculate a target lateral acceleration of the vehicle based on the steering angle and the vehicle speed; and determine that the predetermined end condition is satisfied when a magnitude of an actual lateral acceleration detected by a lateral acceleration sensor mounted in the vehicle is equal to or less than the magnitude of the target lateral acceleration.

According to this configuration, when the magnitude of the actual lateral acceleration is equal to or less than the magnitude of the target lateral acceleration, it is determined that the predetermined end condition is satisfied. Accordingly, the spin prevention yaw moment can be applied to the vehicle until the magnitude of the actual lateral acceleration is equal to or less than the magnitude of the target lateral acceleration.

In the aspect, the at least one electronic control unit may be configured to: calculate a target yaw rate of the vehicle based on the steering angle and the vehicle speed; set the target yaw rate at a time point at which a determination result that there is no likelihood that the vehicle enters the spinning state is changed to a determination result that there is the likelihood that the vehicle enters the spinning state as a reference value of a yaw rate; and determine that the predetermined end condition is satisfied when a difference between a magnitude of the reference value of the yaw rate and a magnitude of an actual yaw rate detected by a yaw rate sensor mounted in the vehicle is equal to or greater than an end reference value of the target yaw rate.

According to this configuration, the target yaw rate at the time point at Which the determination result that there is no likelihood that the vehicle will enter the spinning state is changed to the determination result that there is a likelihood that the vehicle will enter the spinning state is set as a reference value of the yaw rate. When the difference between the magnitude of the reference value of the yaw rate and the magnitude of the actual yaw rate is equal to or greater than the end reference value for the yaw rate, it is determined that the predetermined end condition is satisfied. Accordingly, the spin prevention yaw moment can be applied to the vehicle until the difference between the magnitude of the reference value of the yaw rate and the magnitude of the actual yaw rate is equal to or greater than the end reference value of the yaw rate.

In the aspect, the at least one electronic control unit may be configured to: calculate a target lateral acceleration of the vehicle based on the steering angle and the vehicle speed; set the target lateral acceleration at a time point at which a determination result that there is no likelihood that the vehicle enters the spinning state is changed to a determination result that there is the likelihood that the vehicle enters the spinning state as a reference value of a lateral acceleration; and determine that the predetermined end condition is satisfied when a difference between a magnitude of the reference value of the lateral acceleration and a magnitude of an actual lateral acceleration detected by a lateral acceleration sensor mounted in the vehicle is equal to or greater than an end reference value of the lateral acceleration.

According to this configuration, the target lateral acceleration at the time point at which the determination result that there is no likelihood that the vehicle will enter the spinning state is changed to the determination result that there is a likelihood that the vehicle will enter the spinning state is set as the reference value of the lateral acceleration. When the difference between the magnitude of the reference value of the lateral acceleration and the magnitude of the actual lateral acceleration is equal to or greater than the end reference value for the lateral acceleration, it is determined that the predetermined end condition is satisfied. Accordingly the spin prevention yaw moment can be applied to the vehicle until the difference between the magnitude of the reference value of the lateral acceleration and the magnitude of the actual lateral acceleration is equal to or greater than the end reference value of the lateral acceleration.

In the above aspect, the at least one electronic control unit may be configured to use a phase-compensated normative turning state quantity as the normative turning state quantity of the Vehicle.

In the above aspect, the at least one electronic control unit may be configured to use a phase-compensated normative yaw rate as the normative yaw rate, a phase-compensated normative lateral acceleration as the normative lateral acceleration, and a phase-compensated normative slip angle as the normative slip angle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
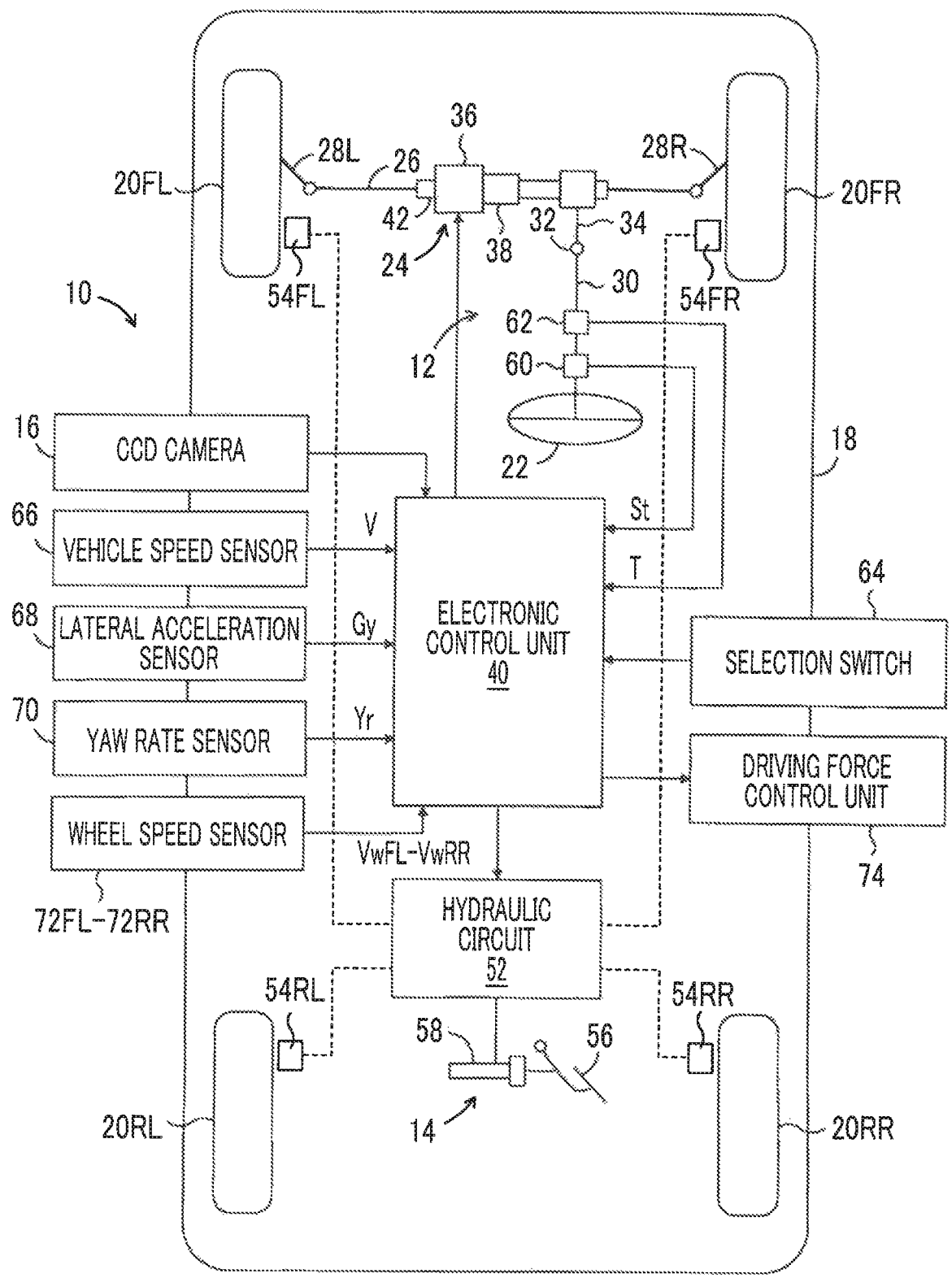
FIG. 1 is a diagram schematically illustrating a configuration of a lane departure prevention system of a vehicle according to a first embodiment of the disclosure.

[Normative Turning State Quantity which May be Employed in Embodiments]

In embodiments, it is determined whether there is a likelihood that a vehicle enters a spinning state based on at least one of a difference between a phase-compensated normative turning state quantity of a vehicle, which is calculated based on a steering angle, a vehicle speed, and a lane departure prevention yaw moment, and an actual turning state quantity and a degree of braking slip of turning inside wheels.

For the purpose of easy understanding of the disclosure, a normative turning state quantity which may be used to determine whether there is a likelihood that a vehicle enters a spinning state will be described before the embodiments will be described.

A vehicle speed is defined as V and a steering angle is defined as St. An overall gear ratio of a steering device of a vehicle is defined as N and a wheelbase of the vehicle is defined as L. A stability factor of the vehicle is defined as Kh and a lateral acceleration of the vehicle is defined as Gy.

A normative yaw rate Yrn of the vehicle when the vehicle turns normally without applying a lane departure prevention yaw moment Mlda to the vehicle is expressed by Equation (1). When a time constant of a primary low-pass filter is defined as Ty and a Laplacian operator is defined as s, a phase-compensated normative yaw rate Yrnf which is a transient yaw rate with a primary delay with respect to the normative yaw rate Yrn is expressed by Equation (2).

$$Yrn = \frac{VSt}{NL} - KhGyV \quad (1)$$

$$Yrnf = Yrn \frac{1}{1 + Ty \cdot s} \quad (2)$$

A normative yaw rate Yrn of the vehicle when the vehicle turns normally without applying the lane departure prevention yaw moment Mlda to the vehicle can also be calculated by Equation (3), and the phase-compensated normative yaw rate Yrnf of the vehicle corresponding to the normative yaw rate Yrn is expressed by Equation (4). Equation (1) is established even when the vehicle travels on a road having a bank angle, but Equation (3) is not established when the vehicle travels on a road having a bank angle. In this specification, the phase-compensated normative yaw rate Yrnf is also referred to as a target yaw rate Yrnf of the vehicle.

$$Yrn = \frac{VSt}{NL} \cdot \frac{1}{1 + KhV^2} \quad (3)$$

$$Yrnf = \left(\frac{VSt}{NL} \cdot \frac{1}{1 + KhV^2}\right) \frac{1}{1 + Ty \cdot s} \quad (4)$$

A normative lateral acceleration Gyn of the vehicle when the vehicle turns normally without applying the lane departure prevention yaw moment Mlda to the vehicle can be calculated by Equation (5). When a time constant of a primary low-pass filter is defined as Tg, a phase-compensated normative lateral acceleration Gynf of the vehicle which is a transient lateral acceleration with a primary delay with respect to the normative lateral acceleration Gyn is expressed by Equation (6). In this specification, the phase-compensated normative lateral acceleration Gynf of the vehicle is also referred to as a target lateral acceleration Gynf of the vehicle.

$$Gyn = \left\{\left(\frac{VSt}{NL} \cdot \frac{1}{1 + KhV^2}\right) \frac{1}{1 + Ty \cdot s}\right\}V \quad (5)$$

$$Gynf = Gyn \frac{1}{1 + Tg \cdot s} \quad (6)$$

Figure 8:
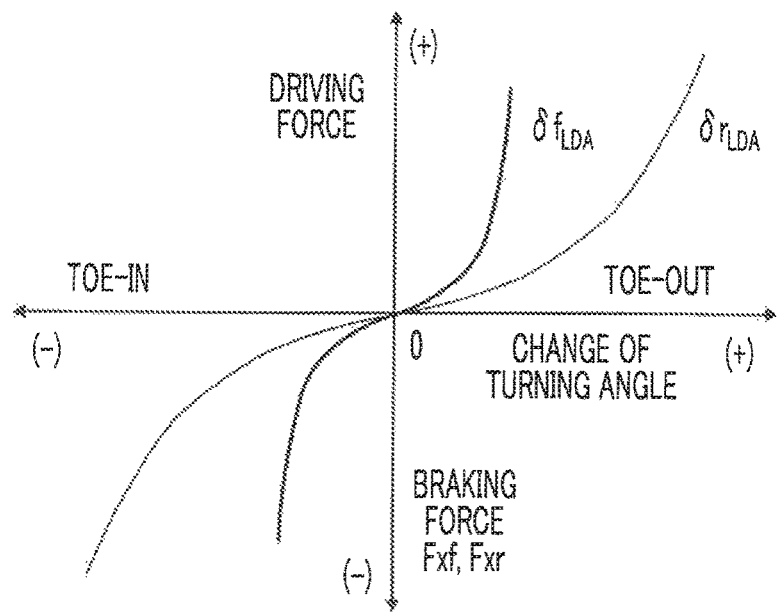
FIG. 8 is a map illustrating a relationship between a braking force and a driving force of vehicle wheels and rates of change of turning angles $\delta f_{LDA}$ and $\delta r_{LDA}$ of a turning inside front wheel and a turning inside rear wheel.

The lane departure prevention yaw moment Mlda is a yaw moment for preventing departure of the vehicle from a lane to the turning outside, and braking forces which are applied to a turning inside front wheel and a turning inside rear wheel to apply the lane departure prevention yaw moment Mlda to the vehicle are defined as Fxf and Fxr, respectively. Rates of change in a turning angle of the turning inside front wheel and the turning inside rear wheel which are caused by applying the braking forces Fxf and Fxr to the turning inside front wheel and the turning inside rear wheel are defined as $\delta f_{LDA}$ and $\delta r_{LDA}$. The rates of change in a turning angle $\delta f_{LDA}$ and $\delta r_{LDA}$ of the turning inside front wheel and the turning inside rear wheel may be calculated with reference to a map illustrated in FIG. 8 based on the braking forces Fxf and Fxr.

Equivalent cornering powers of the front wheel and the rear wheel are defined as Kf and Kr. A nonnative yaw rate $Yr_{LDA}$ when the lane departure prevention yaw moment Mlda is applied to the vehicle by applying the braking forces Fxf and Fxr to the turning inside front wheel and the turning inside rear wheel is expressed by Equation (7). When a tread of the vehicle is defined as W, the lane departure prevention yaw moment Mlda is expressed by Equation (8).

$$Yr_{LDA} = \frac{Kf + Kr}{2L^2 KfKr(1 + KhV^2)} M_{LDA} + \frac{V}{L}(\delta f_{LDA} - \delta r_{LDA})\frac{1}{1 + KhV^2} \quad (7)$$

$$M_{LDA} = (Fxf + Fxr)\frac{W}{2} \quad (8)$$

A phase-compensated normative yaw rate $Yr_{LDA}f$ which is a transient yaw rate with a primary delay with respect to the normative yaw rate $Yr_{LDA}$ is expressed by Equation (9), where the time constant of the primary low-pass filter is defined as $Ty_{LDA}$. A phase-compensated normative lateral acceleration $Gy_{LDA}f$ corresponding to the phase-compensated normative yaw rate $Yr_{LDA}f$ is expressed by Equation (10), where the time constant of the primary low-pass filter is defined as $Tg_{LDA}$.

$$Yr_{LDA}f = Yr_{LDA}\frac{1}{1 + Ty_{LDA} \cdot s} \quad (9)$$

$$Gy_{LDA}f = Yr_{LDA}V\frac{1}{1 + Tg_{LDA} \cdot s} \quad (10)$$

When the lane departure prevention yaw moment Mlda is applied to the vehicle, a lateral acceleration of the vehicle accompanied with application of the lane departure prevention yaw moment Mlda to the vehicle, that is, the phase-compensated normative lateral acceleration $Gy_{LDA}f$, is included in the detected lateral acceleration Gy of the vehicle. Accordingly, the original nonnative yaw rate $Yrn_{LDA}$ when the lane departure prevention yaw moment Mlda is applied to the vehicle is expressed by Equation (11) corresponding to Equation (1). The phase-compensated normative yaw rate $Yrn_{LDA}f$ which is a transient yaw rate with a primary delay with respect to the normative yaw rate $Yrn_{LDA}$ is expressed by Equation (12). The phase-compensated normative lateral acceleration $Gyn_{LDA}f$ of the vehicle corresponding to the normative yaw rate $Yrn_{LDA}$ is expressed by Equation (13). Equation (12) is also established when the vehicle travels on a road with a bank angle.

$$Yrn_{LDA} = \frac{VSt}{NL} - Kh(Gy - Gy_{LDA}f)V \qquad (11)$$

$$Yrnf = Yrn_{LDA}\frac{1}{1+Ty \cdot s} \qquad (12)$$

$$Gyn_{LDA}f = Yrn_{LDA}V\frac{1}{1+Tg_{LDA} \cdot s} \qquad (13)$$

A phase-compensated normative yaw rate Yrvcf of the vehicle when the lane departure prevention yaw moment Mlda is applied to the vehicle is a sum of the phase-compensated normative yaw rate $Yrn_{LDA}f$ expressed by Equation (12) and the phase-compensated normative yaw rate $Yr_{LDA}f$ expressed by Equation (9), and is expressed by Equation (14). Accordingly, when the turning state quantity which is used to determine whether there is a likelihood that the vehicle will enter the spinning state is a yaw rate, the phase-compensated normative yaw rate Yrvcf of the vehicle may be calculated as the normative turning state quantity of the vehicle by Equation (14).

$$Yrvcf = Yrn_{LDA}f + Yr_{LDA}f \qquad (14)$$

A phase-compensated normative lateral acceleration Gyvcf of the vehicle when the lane departure prevention yaw moment Mlda is applied to the vehicle is a sum of the phase-compensated normative lateral acceleration $Gyn_{LDA}f$ expressed by Equation (13) and the phase-compensated normative lateral acceleration $Gy_{LDA}f$ expressed by Equation (10), and is expressed by Equation (15). Accordingly, when the turning state quantity which is used to determine whether there is a likelihood that the vehicle will enter the spinning state is a lateral acceleration, the phase-compensated normative lateral acceleration Gyvcf of the vehicle may be calculated as the normative turning state quantity of the vehicle by Equation (15).

$$Gyvcf = Gyn_{LDA}f + Gy_{LDA}f \qquad (15)$$

When a slip angular velocity of a vehicle is defined as $\beta d$ and a yaw rate of a vehicle is defined as Yr, a slip angular velocity $\beta d$ is expressed by Equation (16). Accordingly, a phase-compensated normative slip angular velocity $\beta dvcf$ of the vehicle when the lane departure prevention yaw moment Mlda is applied to the vehicle is expressed by Equation (17). The third term "Gy−YrV" on the right side of Equation (17) is a correction term of the slip angular velocity of the vehicle due to a bank of a road and may be omitted.

$$\beta d = \frac{Gy}{V} - Yr \qquad (16)$$

$$\beta dvcf = \frac{Gyrnf + Gy_{LDA}f}{V} - (Yrnf + Yr_{LDA}f) + (Gy - YrV) \qquad (17)$$

$$= \frac{Gyvcf}{V} - (Yrnf + Yr_{LDA}f) + (Gy - YrV)$$

Accordingly, when the turning state quantity which is used to determine whether there is a likelihood that the vehicle will enter the spinning state is a slip angle of the vehicle, a value obtained by integrating the phase-compensated normative slip angular velocity $\beta dvcf$ of the vehicle calculated by Equation (15) with respect to time may be calculated as the normative turning state quantity of the vehicle.

Some exemplary embodiments of the disclosure will be described below in detail with reference to the accompanying drawings.

First Embodiment

FIG. 1 is a diagram schematically illustrating a configuration of a lane departure prevention system 10 of a vehicle according to a first embodiment of the disclosure.

In FIG. 1, the lane departure prevention system 10 is applied to a vehicle 18 including a steering device 12 and a brake device 14 and includes a CCD camera 16 and an electronic control unit 40. The CCD camera 16 is disposed in a front part of a vehicle interior of the vehicle 18, and images the front side of the vehicle 18. As will be described later in detail, the electronic control unit 40 determines whether there is a likelihood that the vehicle 18 will depart from a lane which is not illustrated in FIG. 1 to the turning outside based on the detection result of the CCD camera 16. When it is determined that there is a likelihood that the vehicle 18 will depart from the lane to the turning outside, the electronic control unit 40 controls the brake device 14 such that a lane departure prevention yaw moment Mlda is applied to the vehicle by applying braking forces to the turning inside wheels.

The vehicle 18 includes right and left front wheels 20FR and 20FL which are turning wheels and right and left rear wheels 20RR and 20RL which are non-turning wheels. The steering device 12 is configured to change a turning angle of the front wheels 20FR and 20FL in response to a driver's steering operation, and a driving force is supplied to the front wheels 20FR and 20FL from an engine via a transmission although not illustrated in FIG. 1. The vehicle to which the disclosure is applied may be any of a front-wheel drive vehicle, a rear-wheel drive vehicle, and a four-wheel drive vehicle.

The steering device 12 includes a rack-and-pinion electric power steering device 24 which is driven in response to a driver's operation of a steering wheel 22. A rack bar 26 of the electric power steering device 24 is connected to knuckle arms (not illustrated) of the front wheels 20FR and 20FL via tie rods 28R and 28L. The steering wheel 22 is connected to a pinion shaft 34 of the electric power steering device 24 via a steering shaft 30 and a universal joint 32.

In the embodiment illustrated in the drawing, the electric power steering device 24 is a rack-coaxial electric power steering device and includes an electric motor 36 and a conversion mechanism 38 such as a ball screw that converts a rotational torque of the electric motor 36 into a force in a reciprocating direction of the rack bar 26. The electric power steering device 24 is controlled by an electric power steering device (EPS) control unit of the electronic control unit 40. The electric power steering device 24 serves as a steering assist force generator that reduces a steering burden of a driver by generating a steering assist force for driving the rack bar 26 relative to a housing 42.

The steering assist force generator may have an arbitrary configuration as long as it can generate a steering assist force and may be, for example, a column-assist electric power steering device. A steering input device which is operated by a driver is the steering wheel 22, but the steering input device may be a joystick steering lever.

A brake device 14 controls braking forces of the vehicle wheels by controlling pressures in wheel cylinders 54FL, 54FR, 54RL, and 54RR, that is, braking pressures, using a hydraulic circuit 52. Although not illustrated in FIG. 1, the hydraulic circuit 52 includes an oil reservoir, an oil pump, and various valve units and the braking pressures of the wheel cylinders are normally controlled by a master cylinder 58 which is driven in response to a driver's depression of a brake pedal 56. The braking pressures of the wheel cylinders are individually controlled by controlling the hydraulic circuit 52 using a braking force control unit of the electronic control unit 40 if necessary.

Accordingly, the brake device 14 can individually control the braking forces of the vehicle wheels without depending on the driver's braking operation and can apply a lane departure prevention yaw moment Mlda and a spin prevention yaw moment Mps which will be described later to the vehicle 18 based on a difference in braking force between the right and left wheels. Accordingly, the braking force control unit of the electronic control unit 40 controls a lateral position (a lateral difference) and a lateral direction (a yaw angle difference) of the vehicle 18 relative to a lane by controlling the lane departure prevention yaw moment Mlda by controlling the brake device 14.

As illustrated in FIG. 1, in the illustrated embodiment, a steering angle sensor 60 and a steering torque sensor 62 are disposed in the steering shaft 30. The steering angle sensor 60 detects a steering angle St, that is, a rotational angle of the steering shaft 30, as a driver's steering operation amount and the steering torque sensor 62 detects a steering torque T. A signal indicating the steering angle St and a signal indicating the steering torque T are input to a traveling control unit and an EPS control unit of the electronic control unit 40. A selection switch 64 for selecting whether to perform lane departure prevention control is disposed in the vehicle 18.

In addition, a signal indicating a vehicle speed V detected by a vehicle speed sensor 66, a signal indicating a lateral acceleration Gy of the vehicle detected by a lateral acceleration sensor 68, and a signal indicating a yaw rate Yr of the vehicle detected by a yaw rate sensor 70 are input to the traveling control unit of the electronic control unit 40. A signal indicating information of an image of the front side of the vehicle 18 captured by the CCD camera 16 and a signal indicating wheel speeds VwFL to VwRR detected by wheel speed sensors 72FL to 72RR disposed in the vehicle wheels 20FL to 20RR are also input to the traveling control unit of the electronic control unit 40. The traveling control unit of the electronic control unit 40 controls the braking forces of the vehicle wheels by outputting a command signal to the braking force control unit if necessary and controls the driving force of the vehicle 18 by outputting a command signal to a driving force control unit 74 if necessary. The controls units transmit and receive necessary signal to and from each other.

Each control unit of the electronic control unit 40 may include a microcomputer including a CPU, a ROM, a RAM, and an input and output port units which are connected to each other via a bidirectional common bus. A program such as a lane departure prevention program is stored in the ROM and lane departure prevention control or the like is performed by the CPU in accordance with a corresponding control program. The steering angle θ and the steering torque T have positive values when steering is performed in a left turning direction, and state quantities of the vehicle such as a lateral acceleration Gy and a yaw rate Yr and normative state quantities have positive values when the vehicle turns left.

As will be described in detail later, in the first embodiment, the traveling control unit of the electronic control unit 40 performs lane departure prevention control in accordance with the program illustrated as the flowchart in FIGS. 2 and 3. The traveling control unit specifies a lane based on information of an image of the front side of the vehicle 18 captured by the CCD camera 16 and specifies a positional relationship of the vehicle 18 relative to the lane. Accordingly, the CCD camera 16 and the traveling control unit serve as a detector that detects a positional relationship of the vehicle 18 relative to the lane.

The traveling control unit calculates a target yaw moment (a target lane departure prevention yaw moment) Mldat for preventing the vehicle 18 from departing from a lane based on the positional relationship of the vehicle 18 relative to the lane. The traveling control unit controls the brake device 14 and applies the braking forces Fxf and Fxr to the turning inside front and rear wheels, such that the lane departure prevention yaw moment Mlda applied to the vehicle reaches the target lane departure prevention yaw moment Mldat to prevent the vehicle 18 from departing from the lane to the turning outside.

Particularly, when the lane departure prevention yaw moment Mlda is applied to the vehicle 18 by applying the braking forces to the turning inside front and rear wheels, the traveling control unit of the electronic control unit 40 determines whether there is a likelihood that the vehicle enters a spinning state. When it is determined that there is a likelihood that the vehicle will enter a spinning state, the traveling control unit calculates a target spin prevention yaw moment Mpst for preventing the vehicle 18 from entering the spinning state until predetermined end conditions are established. The traveling control unit controls the brake device 14 and applies the braking forces to the turning outside wheels such that the spin prevention yaw moment Mps applied to the vehicle reaches the target spin prevention yaw moment Mpst.

Figure 4:
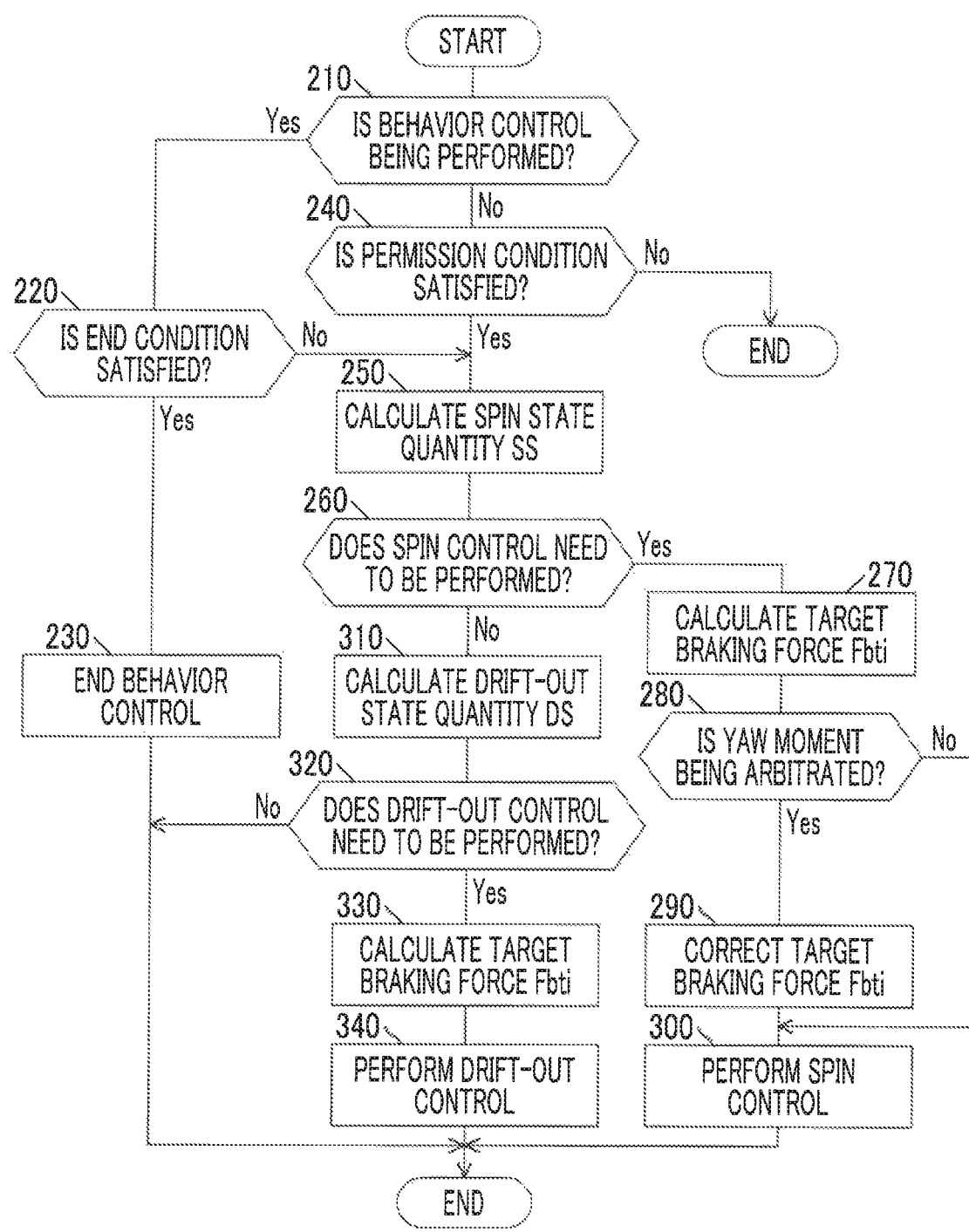
FIG. 4 is a flowchart illustrating a behavior control routine according to the first embodiment.

The traveling control unit of the electronic control unit 40 performs behavior control of the vehicle in accordance with the flowchart illustrated in FIG. 4. That is, as will be described later in detail, when the vehicle enters the spinning state, the traveling control unit performs spin control of reducing a degree of spin of the vehicle by applying the braking force to at least the turning outside front wheel to decelerate the vehicle and applying the spin prevention yaw moment Mspn to the vehicle. When the vehicle enters a drift-out state, the traveling control unit performs drift-out control of reducing a degree of drift-out of the vehicle by applying the braking force to at least the turning inside rear wheel to decelerate the vehicle and applying a drift-out prevention yaw moment Mdro to the vehicle. The behavior control of the vehicle may be performed in an arbitrary way known in the art such as a method described in Japanese Patent Application Publication No. 2006-282168 (JP 2006-282168 A).

<Lane Departure Prevention Control Routine>

A lane departure prevention control routine according to the first embodiment will be described below with reference to the flowchart illustrated in FIG. 2. The lane departure prevention control routine based on the flowchart illustrated in FIG. 2 is repeatedly performed at predetermined intervals when an ignition switch which is not illustrated in FIG. 1 and the selection switch 64 are turned on. Although not being illustrated as a step in FIG. 2, the lane departure prevention control routine may be stopped when the vehicle stops. In the following description, the lane departure prevention control based on the flowchart illustrated in FIG. 2 is simply referred to as a "control routine." The same is true of other embodiments to be described later.

First, in Step 10, a target lane departure prevention yaw moment Mldat (abbreviated to a "target yaw moment Mldat" if necessary) for preventing the vehicle 18 from departing from the lane to the turning outside is calculated in accordance with the flowchart of a sub routine illustrated in FIG. 3 which will be described later.

In Step 20, it is determined whether the target yaw moment Mldat is zero, that is, it is determined whether the lane departure prevention yaw moment Mlda needs to be applied to the vehicle 18. The control routine ends temporarily when the determination result is positive, and the control routine transitions to Step 30 when the determination result is negative.

In Step 30, it is determined whether a driving operation, for example, a braking operation and/or a steering operation, has been performed by a driver. The control routine transitions to Step 50 when the determination result is negative, and the control routine transitions to Step 40 such that the vehicle 18 travels in accordance with a driver's driving operation when the determination result is positive.

In Step 40, when the lane departure prevention yaw moment Mlda is applied to the vehicle 18, the target lane departure prevention yaw moment Mldat decreases gradually to be zero and thus the yaw moment Mlda decreases gradually to be zero. On the other hand, when the spin prevention yaw moment Mps is applied to the vehicle 18, the target spin prevention yaw moment Mpst (abbreviated to a "target yaw moment Mpst" if necessary) decreases gradually to be zero and thus the yaw moment Mps decreases gradually to be zero.

In Step 50, first, it is determined whether the target lane departure prevention yaw moment Mldat is a yaw moment for preventing departure of the vehicle 18 from the lane to the turning outside and the braking three is applied to the turning inside wheels. The control routine transitions to Step 60 when the determination result is negative, and it is determined whether there is a likelihood that the vehicle 18 will enter the spinning state when the determination result is positive. The control routine transitions to Step 60 when the determination result is negative, and the control routine transitions to Step 100 when the determination result is positive.

In this case, for example, when any one of following conditions (A) to (D) is satisfied, it may be determined that there is a likelihood that the vehicle 18 will enter the spinning state. At least one of the following conditions (A) to (D) may be omitted. (A) The phase-compensated normative yaw rate Yrvcf of the vehicle is calculated by Equation (14) and the product of a difference Yr−Yrvcf between the actual yaw rate Yr and the normative yaw rate Yrvcf and the sign of the yaw rate Yr is greater than a reference value Yrs (a positive constant). (B) The phase-compensated normative lateral acceleration Gyvcf of the vehicle is calculated by Equation (15) and the product of a difference Gy−Gyvcf between the actual lateral acceleration Gy and the normative lateral acceleration Gyvcf and the sign of the lateral acceleration Gy is greater than a reference value Gys (a positive constant). (C) The phase-compensated normative yaw rate $Yr_{LDA}f$ of the vehicle is set to zero, the normative slip angular velocity βdvcf of the vehicle is calculated by Equation (17), and the product of a difference between a time-integral value of the normative slip angular velocity βdvcf and the actual slip angle β of the vehicle and the sign of the slip angle β of the vehicle is greater than a reference value βs (a positive constant). The slip angle β of the vehicle may be calculated in the same way as in Step 250 which will be described later. (D) Braking slip rates SLinf and SLinr of the turning inside front and rear wheels are calculated based on wheel speeds VwFL to VwFR, and at least one of the braking slip rates SLinf and SLinr is greater than a reference value SLins (a positive constant).

In Step 60, it is determined whether the spin prevention yaw moment Mps is applied to the vehicle 18. When the determination result is positive, the target yaw moment Mpst for preventing spin of the vehicle 18 decreases gradually, which is not illustrated as a step, and the control routine transitions to Step 110. On the other hand, when the determination result is negative, the control routine transitions to Step 70.

In Step 70, a command signal indicting the target lane departure prevention yaw moment Mldat is output to the braking control unit and the braking forces are applied to the turning inside front and rear wheels such that the yaw moment Mlda applied to the vehicle 18 reaches the target lane departure prevention yaw moment Mldat. The braking forces of the turning inside front and rear wheels are controlled at a predetermined distribution ratio.

In Step 80, it is determined whether there is a likelihood that the vehicle 18 will depart from the lane to the turning outside, for example, by determining whether the time Tout (see FIG. 3) up to lane departure which has been calculated in Step 10 is greater than an end reference value Toute (a positive constant). The control routine ends temporarily when the determination result is negative, and the control routine transitions to Step 90 when the determination result is positive.

In Step 90, outputting of the command signal indicating the target lane departure prevention yaw moment Mldat to the braking control unit ends and the control routine ends temporarily. Accordingly, the lane departure prevention control routine is continuously performed, but the yaw moment Mlda based on the target lane departure prevention yaw moment Mldat is not applied to the vehicle.

In Step 100, the target yaw moment (the target spin prevention yaw moment) Mpst for preventing spin of the vehicle 18 is calculated by Equation (18) with Kps defined as a negative constant coefficient. Although not illustrated in FIG. 2, the phase-compensated normative yaw rate Yrvcf of the vehicle and the phase-compensated normative lateral acceleration Gyvcf of the vehicle are calculated by Equations (14) and (15).

$$Mpst = Kps \times Mldat \tag{18}$$

Although not illustrated in FIG. 2, when the target spin prevention yaw moment Mpst and the like are calculated in Step 100, Steps 50 and 100 are skipped until the determination, result of Step 140 which will be described later is positive. That is, when the determination result of Step 30 is negative, the control routine transitions to Step 110.

In Step 110, it is determined that the vehicle 18 enters the spinning state by a behavior control routine based on the flowchart illustrated in FIG. 4 to be described later and it is determined whether the spin control of the behavior control is performed. The control routine transitions to Step 130 when the determination result is positive, and the control routine transitions to Step 120 when the determination result is negative.

In Step 120, the command signal indicating the target spin prevention yaw moment Mpst is output to the braking control unit and the braking forces are applied to the turning outside front and rear wheels such that the spin prevention yaw moment Mps applied to the vehicle 18 reaches the target spin prevention yaw moment Mpst. The braking forces of the turning outside front and rear wheels are controlled such that a predetermined distribution ratio is achieved. The braking force may be applied to only the turning outside front wheel.

In Step 130, a spin prevention yaw moment Mpsn of the behavior control is calculated, for example, based on the target braking force Fbti of each vehicle wheels calculated in Step 270 to be described later, and the target spin prevention yaw moment Mpst and the spin prevention yaw moment Mspn are arbitrated. When the yaw moments Mpst and Mspn have the same direction and the magnitude of Mpst is greater than the magnitude of Mspn, a command signal for correcting the spin prevention yaw moment Mspn to zero is output in the behavior control routine. When Mpst and Mspn have the same direction and the magnitude of Mpst is equal to or less than the magnitude of Mspn and when Mpst and Mspn have different directions, the target spin prevention yaw moment Mpst is corrected to zero.

In Step 140, it is determined whether an end condition of the control routine of the yaw moment based on the target spin prevention yaw moment Mpst is satisfied. The control routine ends temporarily when the determination result is negative, and the control routine transitions to Step 150 when the determination result is positive.

In this case, for example, when the following conditions (G) and (H) are satisfied, it is determined that an end condition of the control routine of the yaw moment based on the target yaw moment Mpst is satisfied. In Step 50, Condition (G) may be omitted when Condition (A) is omitted, or Condition (H) may be omitted when Condition (B) is omitted. (G) The target yaw rate Yrnf is calculated by Equation (2) or (4) and the absolute value of the actual yaw rate Yr is equal to or less than the absolute value of the target yaw rate Yrnf. (H) The target lateral acceleration Gynf is calculated by Equation (6) and the absolute value of the actual lateral acceleration Gy is equal to or less than the absolute value of the target lateral acceleration Gynf.

In Step 150, outputting of the command signal indicating the target spin prevention yaw moment Mpst to the braking control unit ends and the control routine ends temporarily. Accordingly, the yaw moment based on the target spin prevention yaw moment Mpst is not applied to the vehicle.

Calculation of the target lane departure prevention yaw moment Mldat of the vehicle 18 which is performed in Step 10 will be described below with reference to the flowchart illustrated in FIG. 3.

First, in Step 11, for example, a white line of a road is detected by processing image information of the front side of the vehicle 18 captured by the CCD camera 16, and a lane in which the vehicle 18 travels is specified based on the detected white line.

In Step 12, the positional relationship of the vehicle 18 relative to the lane is specified. For example, using a line passing through the center between the right and left white lines as a target locus, a radius of the target locus, a difference in the lateral direction between a reference position of the vehicle 18 (for example, the center) and the target locus, and a difference in the yaw direction of the vehicle 18 (an angle formed by the longitudinal direction of the vehicle with respect to the target locus) are specified.

In Step 13, the time Tout until the vehicle 18 departs from the lane to the turning outside by going over the white line is calculated based on the positional relationships of the right and left white lines relative to the vehicle 18, the vehicle speed V, the difference in the lateral direction of the reference position of the vehicle 18 from the target locus, the difference in the yaw direction, and the like. When there is no likelihood that the vehicle 18 will depart from the lane to the turning outside, the time Tout is set to a preset value Toutc (a positive constant which is greater than a reference value Touts to be described later).

In Step 14, it is determined whether the time Tout up to departure from the lane is less than the reference value Touts (a positive constant which is less than a reference value Toute to be described later), that is, whether there is a likelihood that the vehicle 18 will depart from the lane to the turning outside. The control routine transitions to Step 18 when the determination result is negative, and the control routine transitions to Step 15 when the determination result is positive.

In Step 15, it is determined whether a driving operation, for example, a steering operation and/or a braking operation, has been performed by a driver. When the determination result is positive, the target yaw moment Mldat is set to zero in Step 18 and then the control routine ends temporarily. When the determination result is negative, the control routine transitions to Step 16.

In Step 16, a warning device not illustrated in FIG. 1 operates to issue an alarm indicating that there is a likelihood that the vehicle will depart from the lane to the turning outside to an occupant of the vehicle. Even when there is a likelihood that the vehicle will depart from the lane to the turning inside, an alarm indicating the likelihood is issued. The warning device may output auditory information such as a warning sound or a warning message, visual information such as a warning lamp or a warning display on a monitor, a tactual alarm such as vibration of the steering wheel 22, or a combination thereof.

In Step 17, the target lane departure prevention yaw moment Mldat is calculated in a way known in the art based on the radius of the target locus, the difference in the lateral direction of the reference position of the vehicle 18 from the target locus, and the difference in the yaw direction of the vehicle 18 from the target locus. For example, the target lane departure prevention yaw moment Mldat may be calculated using a method described in Japanese Patent Application Publication No 2001-310719 (JP 2001-310719 A). In Step 18, the target yaw moment Mldat is set to zero.

<Behavior Control Routine>

A behavior control routine will be described below with reference to the flowchart illustrated in FIG. 4. The behavior control based on the flowchart illustrated in FIG. 4 is repeatedly performed at predetermined intervals by the traveling control unit of the electronic control unit 40 when an ignition switch which is not illustrated in the drawing is turned on. The behavior control routine is the same in second and third embodiments which will be described later.

First, in Step 210, it is determined whether a braking force is applied through behavior control. The behavior control routine transitions to Step 240 when the determination result is negative, and the behavior control routine transitions to Step 220 when the determination result is positive.

In Step 220, it is determined whether a predetermined end condition of the behavior control is satisfied. The behavior control routine transitions to Step 250 when the determination result is negative, and the behavior control routine transitions to Step 230 when the determination result is positive.

In Step 230, the braking force which is applied through the behavior control decreases gradually to be zero and thus application of the braking force through the behavior control ends.

In Step 240, it is determined whether a preset permission condition of the behavior control is satisfied. The behavior control routine ends temporarily when the determination result is negative, and the behavior control routine transitions to Step 250 when the determination result is positive.

In Step 250, a spin state quantity SS of the vehicle 18 is calculated. The spin state quantity SS has only to be a value indicating a degree of spin of the vehicle and may be calculated in any way. For example, a difference of the lateral acceleration, that is, a lateral slip acceleration Vyd of the vehicle, is calculated as a difference Gy−V·Yr between the lateral acceleration Gy of the vehicle and the product V·Yr of the vehicle speed V and the yaw rate Yr. A lateral slip speed Vy of the vehicle body is calculated by integrating the lateral slip acceleration Vyd, and the slip angle β of the vehicle body is calculated as a ratio Vy/Vx of the lateral slip speed Vy of the vehicle body to the longitudinal speed Vx vehicle speed V) of the vehicle body.

With K1 and K2 defined as positive constants, an amount of spin SV is calculated as a linear sum K1·β+K2·Vyd of the slip angle β and the lateral slip acceleration Vyd of the vehicle body and the turning direction of the vehicle is determined based on the sign of the yaw rate Yr. Then, the spin state quantity SS is calculated to be SV at the time of turning of the vehicle to left, and is calculated to be −SV at the time of turning of the vehicle to right, and the spin state quantity is zero when the calculation result has a negative value. The amount of spin SV may be calculated as a linear sum of the slip angle β of the vehicle body and a differential value βd thereof.

In Step 260, it is determined whether the spin state quantity SS is equal to or greater than a start reference value SSs (a positive constant) of spin control, that is, it is determined whether control of the braking force through the spin control needs to be performed. The behavior control routine transitions to Step 310 when the determination result is negative, and the behavior control routine transitions to Step 270 when the determination result is positive.

In Step 270, target braking forces Fbti (i=fl, fr, rl, and rr) of the front-left wheel, the front-right wheel, the rear-left wheel, and the rear-right wheel for decreasing the degree of slip of the vehicle are calculated by decreasing the magnitude of the yaw rate Yr of the vehicle 18 based on the spin state quantity SS and decelerating the vehicle.

Figure 2:
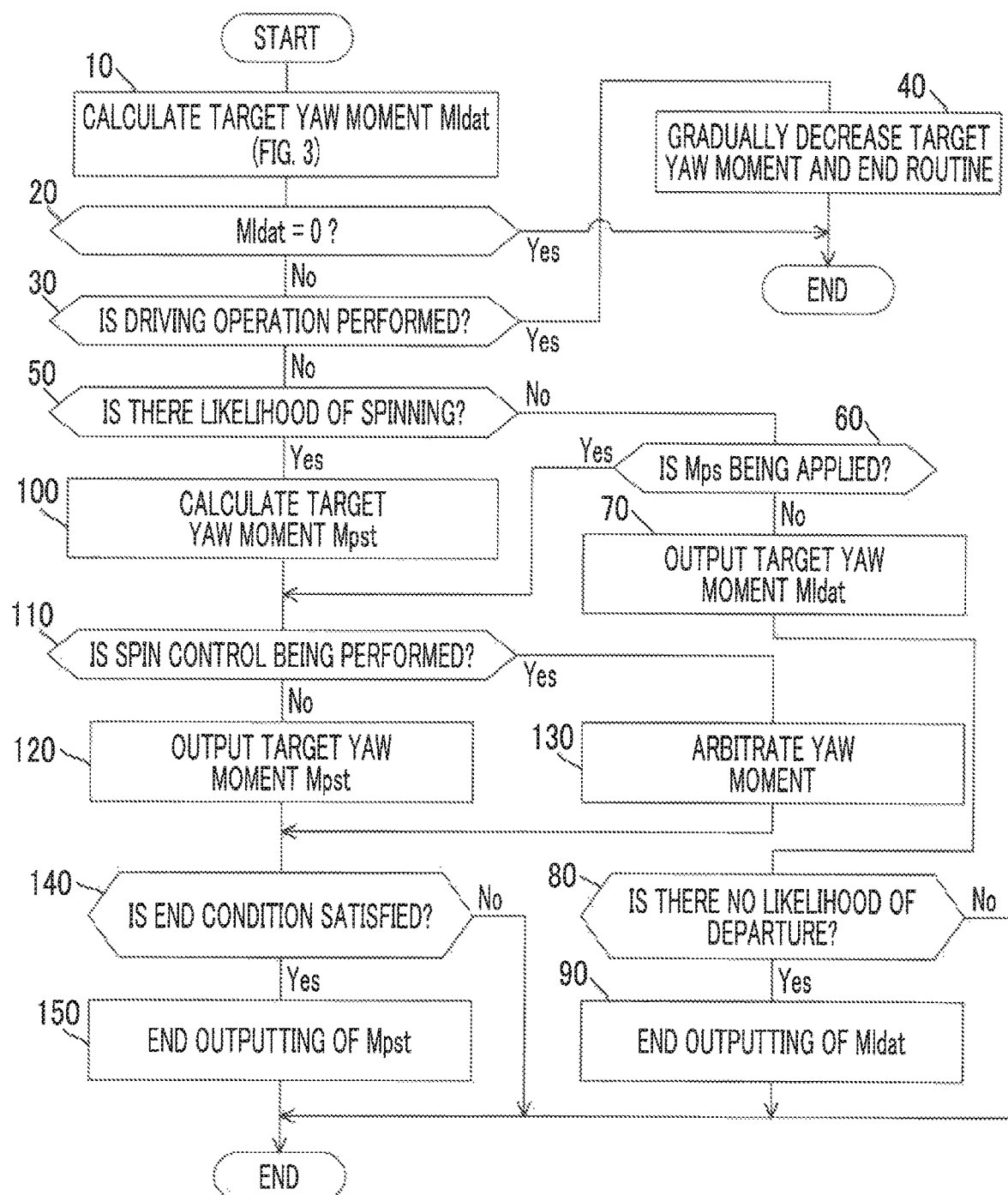
FIG. 2 is a flowchart illustrating a lane departure prevention control routine according to the first embodiment.

In Step 280, it is determined whether arbitration of the yaw moment is being performed in Step 130 in the flowchart illustrated in FIG. 2. The behavior control routine transitions to Step 300 when the determination result is negative, and the behavior control routine transitions to Step 290 when the determination result is positive.

In Step 290, the target braking forces Fbti of the wheels are corrected based on the arbitration result of the yaw moment in Step 130. That is, the target braking forces Fbti of the wheels for applying the arbitrated yaw moment to the vehicle 18 is calculated.

In Step 300, the brake device 14 is controlled such that the braking forces of the vehicle wheels reach the corresponding target braking forces Fbti. Accordingly, braking force control based on the spin control of decreasing the degree of spin of the vehicle is performed by decreasing the magnitude of the yaw rate Yr of the vehicle 18 and decelerating the vehicle.

In Step 310, a drift-out state quantity DS of the vehicle 18 is calculated. The drift-out state quantity DS has only to be a value indicating a degree of drift-out of the vehicle and may be calculated in any way. For example, the target yaw rate Yrnf is calculated by Equation (4). An amount of drift-out DV is calculated by Equation (19) and the turning direction of the vehicle is determined based on the sign of the yaw rate Yr. The drift-out state quantity DS is calculated to be DV at the time of turning of the vehicle to left and to be −DV at the time of turning of the vehicle to right and the drift-out state quantity is zero when the calculation result has a negative value. The amount of drift-out DV may be calculated by Equation (20).

$$DV=(Yrnf-Yr) \tag{19}$$

$$DV=L(Yrnf-Yr)/V \tag{20}$$

In Step 320, it is determined whether the drift-out state quantity DS is equal to or greater than a start reference value DSs (a positive constant) of the drift-out control, that is, it is whether braking force control based on the drift-out control needs to be performed. The behavior control routine ends temporarily when the determination result is negative, and the behavior control routine transitions to Step 330 when the determination result is positive.

In Step 330, the target braking threes Fbti (i=fl, fr, rl, and rr) of the front-left wheel, the front-right wheel, the rear-left wheel, and the rear-right wheel for applying a yaw moment for increasing the magnitude of the yaw rate Yr of the vehicle 18 to the vehicle and decelerating the vehicle are calculated based on the drift-out state quantity DS.

In Step 340, the brake device 14 is controlled such that the braking forces of the vehicle wheels reach the corresponding target braking forces Fbti. Accordingly, the braking force control based on the drift-out control of reducing a degree of drift-out of the vehicle by applying the yaw moment for increasing the magnitude of the yaw rate Yr of the vehicle 18 and decelerating the vehicle is performed.

<Operation in First Embodiment>

An operation in the first embodiment in a situation in which a driving operation is not performed by a driver will be described below. When a driving operation is performed by a driver, the determination result of Step 30 is positive, and the lane departure prevention yaw moment Mlda and the spin prevention yaw moment Mps decrease gradually to be zero or is kept at zero by performing Step 40. Operations in second and third embodiments which will be described later are the same as the operation in the first embodiment except points which will be particularly mentioned later.

(X) Case in which there is No Likelihood of Departure from a Lane and there is No Likelihood of Spinning When there is no likelihood that the vehicle 18 will depart from the lane to the turning outside and there is no likelihood that the vehicle 18 will enter a spinning state, the target lane departure prevention yaw moment Mldat is calculated to be zero in Step 10. Accordingly, since the determination result of Step 20 is positive, the steps subsequent to Step 30 are not performed. Accordingly, the lane departure prevention yaw moment Mlda and the spin prevention yaw moment Mps are not applied to the vehicle 18.

(Y) Case in which There is a Likelihood of Departure from a Lane but There is No Likelihood of Spinning When there is a likelihood that the vehicle 18 will depart from the lane to the turning outside but there is no likelihood that the vehicle 18 will enter the spinning state, the determination results of Steps 20, 30, 50, 60, and 80 are negative. Accordingly, in Step 70, a command signal indicating the target lane departure prevention yaw moment Mldat is output to the braking control unit and thus braking forces are applied to the turning inside front and rear wheels such that the yaw moment Mlda corresponding to the target lane departure prevention yaw moment Mldat is applied to the vehicle 18.

When there is no likelihood that the vehicle 18 will depart from the lane to the turning outside, the determination result of Step 80 is positive. Accordingly, since outputting of the command signal indicating the target lane departure prevention yaw moment Mldat to the braking control unit is ended in Step 90, the yaw moment based on the target lane departure prevention yaw moment Mldat is not applied to the vehicle 18.

(Z) Case in which there is a Likelihood of Departure from a Lane and there is a Likelihood of Spinning When there is a likelihood that the vehicle 18 will enter the spinning state in a situation in which there is a likelihood that the vehicle 18 will depart from the lane to the turning outside, the determination results of Steps 20 and 30 are negative and the determination result of Step 50 is positive. The target spin prevention yaw moment Mpst is calculated in Step 100, and the determination result of Step 110 is negative when control of the braking forces based on the spin control of the behavior control is not performed. Accordingly, by performing Step 120 until the determination result of Step 140 is positive, the spin prevention yaw moment Mps corresponding to the target spin prevention yaw moment Mpst is applied to the vehicle 18 instead of the lane departure prevention yaw moment Mlda.

When control of the braking forces based on the spin control of the behavior control is performed, the determination result of Step 110 is positive. Accordingly, until the positive determination result is made in Step 140, the target spin prevention yaw moment Mpst and the spin prevention yaw moment Mspn are arbitrated in Step 130.

When there is no likelihood that the vehicle 18 will enter the spinning state in a situation in which the spin prevention yaw moment Mps is applied to the vehicle 18, the determination result of Step 50 is negative, the determination result of Step 60 is positive, and the target spin prevention yaw moment Mpst decreases gradually. Accordingly, when the spin control of the behavior control is not performed, the determination result of Step 110 is negative and the spin prevention yaw moment Mps corresponding to the target spin prevention yaw moment Mpst is applied to the vehicle 18 in Step 120. When the determination result of Step 140 is positive and the target spin prevention yaw moment Mpst is zero, the lane departure prevention yaw moment based on the target lane departure prevention yaw moment Mldat is applied to the vehicle 18 by performing Step 70 until the determination result of Step 60 is negative and the determination result of Step 80 is positive.

When there is a likelihood that the vehicle 18 will depart from the lane to the turning inside, the lane departure prevention yaw moment Mlda in a direction in which the turning radius of the vehicle increases is applied to the vehicle by applying the braking forces to the turning outside wheels. Accordingly, when the turning radius of the vehicle increases and the centrifugal force acting on the vehicle decreases, the vehicle does not enter the spinning state due to lack of a lateral force of the turning outside rear wheel even if the braking threes are applied to the turning outside wheels.

Figure 5:
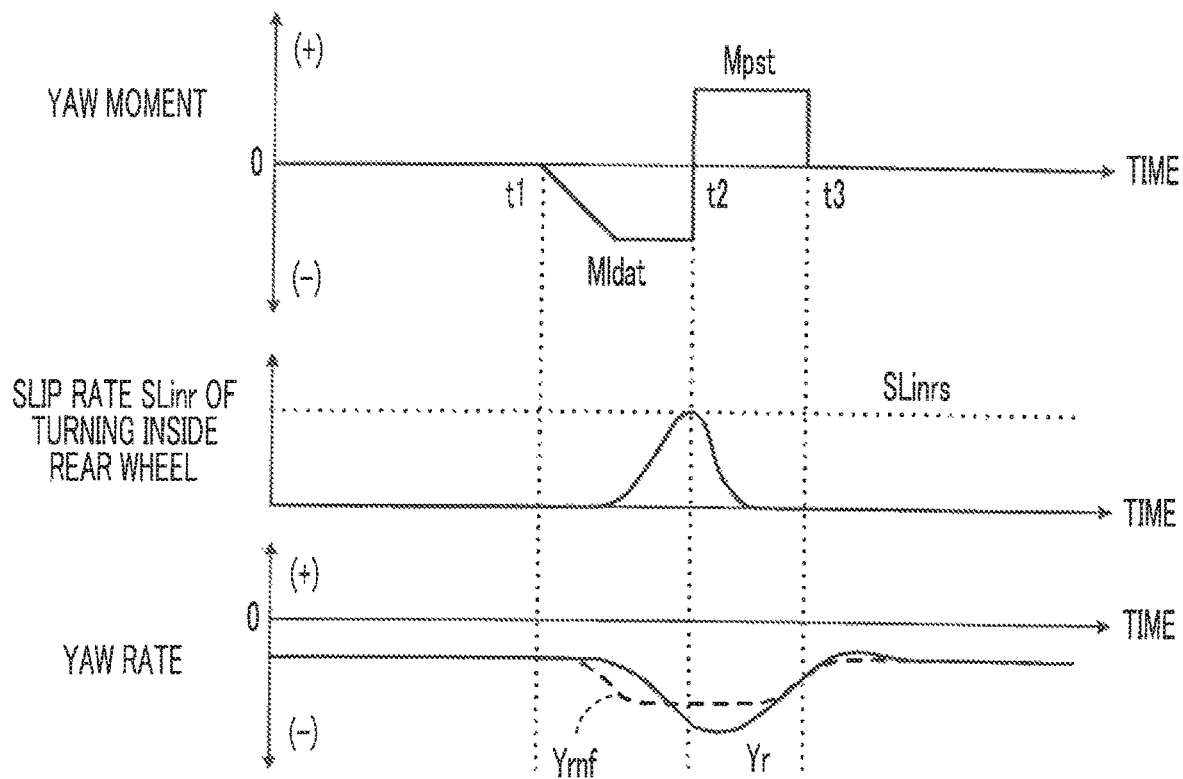
FIG. 5 is a timing chart illustrating an example of operations in the first embodiment.

The operation in the first embodiment in a case in which there is a likelihood that the vehicle will depart from the lane to the turning outside in a situation in which the vehicle 18 turns right on a low-μ road and there is a likelihood that the vehicle will enter the spinning state in such a situation will be described below. FIG. 5 illustrates an example of changes of a yaw moment applied to the vehicle 18 (the upper stage), a braking slip rate SLinr of the turning inside rear wheel (the middle stage), and a yaw rate Yr of the vehicle 18 (the lower stage). For the purpose of convenience of explanation, as illustrated in FIG. 5, it is assumed that there is a likelihood that the vehicle will depart from the lane to the turning outside due to a change of a frictional coefficient of the road surface or the like in a situation in which the vehicle turns right at a constant yaw rate Yr. This is true of FIGS. 6 and 7 to be described later.

At time t1, it is assumed that the determination result of whether there is a likelihood that the vehicle 18 will depart from the lane to the turning outside (Step 14) is changed from the determination result that "there is no likelihood (negative determination)" to the determination result that "there is a likelihood (positive determination)." it is also assumed that the determination result of whether there is a likelihood that the vehicle will enter the spinning state (Step 50) is changed from the determination result that "there is no likelihood (negative determination)" to the determination result that "there is a likelihood (positive determination)" at time t2 and the end conditions (Step 140) are satisfied at time t3. It is also assumed that the magnitudes of the braking slip rate SLinr of the turning inside rear wheel and the yaw rate Yr of the vehicle 18 increase between time t1 and time t2 and the braking slip rate SLinr is greater than a reference value SLinrs at time t2. This is also true of FIGS. 6 and 7 to be described later.

As illustrated in FIG. 5, at time t1, the target lane departure prevention yaw moment Mldat (Step 10) has a value other than zero and application of the lane departure prevention yaw moment Mlda to the vehicle 18 is started (Step 70). At time t2, calculation and outputting of the target spin prevention yaw moment Mpst are started (Steps 100 and 120) and thus application of the spin prevention yaw moment Mps to the vehicle 18 is started. At the same time, application of the lane departure prevention yaw moment Mlda to the vehicle 18 is ended. At time t3, the absolute value of the actual yaw rate Yr is equal to or less than the absolute value of the target yaw rate Yrnf and the yaw moment Mps is not applied to the vehicle 18.

Figure 9:
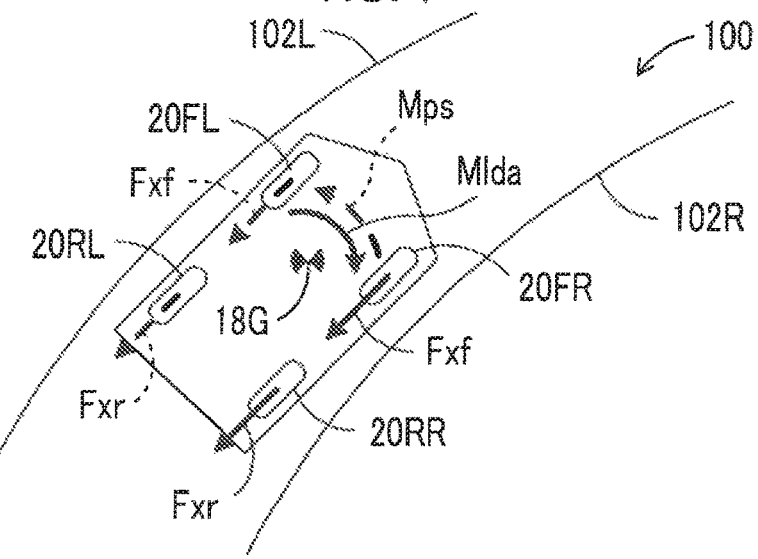
FIG. 9 is a diagram illustrating a situation in which a yaw moment Mlda is applied to a vehicle by applying braking forces Fxf and Fxr to the turning inside front and rear wheels.

Accordingly, from time t1 to time t2, the braking forces Fxf and Fxr are applied to the turning inside front and rear wheels 20FR and 20RR as indicated by solid lines in FIG. 9. Accordingly, the lane departure prevention yaw moment Mlda acting in the clockwise direction around the center 18G is applied to the vehicle 18. On the other hand, from time t2 to time t3, the braking forces Fxf and Fxr are applied to the turning outside front and rear wheels 20FL and 20RL as indicated by dotted lines in FIG. 9. Accordingly, the spin prevention yaw moment Mps acting in the counterclockwise direction around the center 18G is applied to the vehicle 18. In FIG. 9, reference numeral 100 denotes a lane and 102L and 102R denote left and right white lines of the lane 100.

Application of the lane departure prevention yaw moment Mlda to the vehicle 18 is ended at time t2, and the spin prevention yaw moment Mps is applied to the vehicle 18 from time t2 to just before time t3. Accordingly, the braking slip rate SLinr of the turning inside rear wheel decreases just after time t2, and the magnitude of the yaw rate Yr of the vehicle 18 decreases gradually from a time point passing over time t2 to time t3.

As can be seen from the above description, according to the first embodiment, it is possible to prevent the vehicle 18 from entering a spinning state even when there is a likelihood that the vehicle 18 will depart from the lane to the turning outside and there is a likelihood that the vehicle will enter the spinning state due to application of the lane departure prevention yaw moment Mlda to the vehicle. That is, it is possible to prevent the vehicle 18 from entering the spinning state due to the lane departure prevention yaw moment Mlda using the spin prevention yaw moment Mps without depending on the spin control of the behavior control.

Particularly, according to the first embodiment, the target spin prevention yaw moment Mpst is calculated by Equation (18) in Step 100. Accordingly, since the target spin prevention yaw moment Mpst is calculated to be a value proportional to the target lane departure prevention yaw moment Mldat when the determination result of whether there is a likelihood that the vehicle will enter the spinning state is changed from the determination result that there is no likelihood to the determination result that there is a likelihood, the magnitude of the spin prevention yaw moment Mps can be set to vary depending on the magnitude of the lane departure prevention yaw moment Mlda. Accordingly, in comparison with a ease in which the magnitude of the target spin prevention yaw moment Mpst is constant, it is possible to reduce a likelihood that the magnitude of the spin prevention yaw moment Mps is excessive and deficient for preventing the vehicle 18 from entering the spinning state. In other words, an increase in likelihood that the vehicle 18 will depart from the lane to the turning outside due to excess of the spin prevention yaw moment Mps can be prevented and a likelihood that the vehicle 18 will not be effectively prevented from entering the spinning state due to deficiency of the spin prevention yaw moment Mps can be reduced.

Second Embodiment

Figure 3:
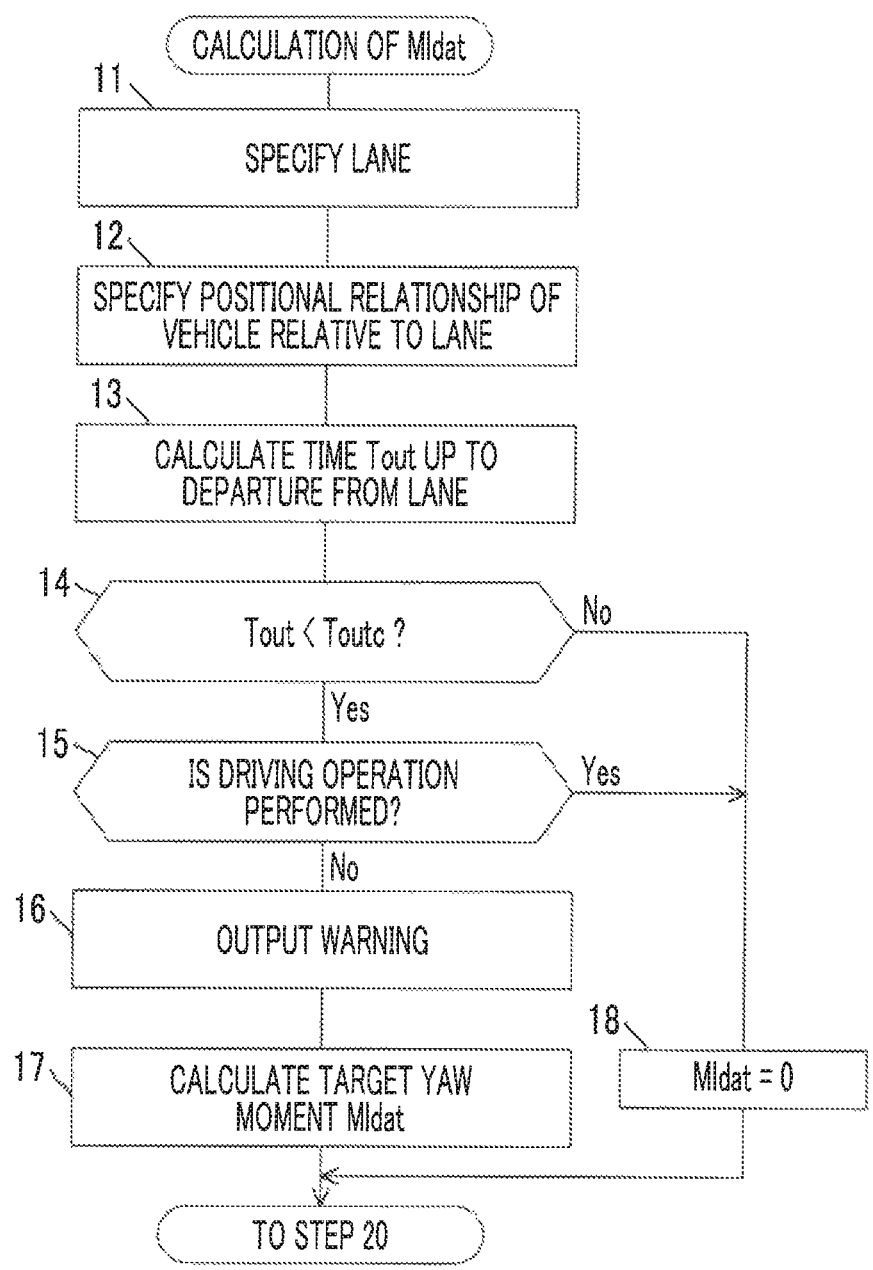
FIG. 3 is a flowchart illustrating a sub routine of calculating a target lane departure prevention yaw moment Mldat which is performed in Step 10 of the flowchart illustrated in FIG. 2.

In a second embodiment, the lane departure prevention control is performed in the same way as in the first embodiment in accordance with the flowcharts illustrated in FIGS. 2 and 3 except for Steps 100 and 140.

In Step 100 in the second embodiment, similarly to the first embodiment, the target yaw moment Mpst, the phase-compensated normative yaw rate Yrvcf of the vehicle, and the phase-compensated normative lateral acceleration Gyvcf of the vehicle are calculated. The yaw rate Yr and the lateral acceleration Gy of the vehicle detected by the yaw rate sensor 70 and the lateral acceleration sensor 68 are stored as a reference value Yrr of the yaw rate and a reference value Gyr of the lateral acceleration in the RAM.

Figure 10:
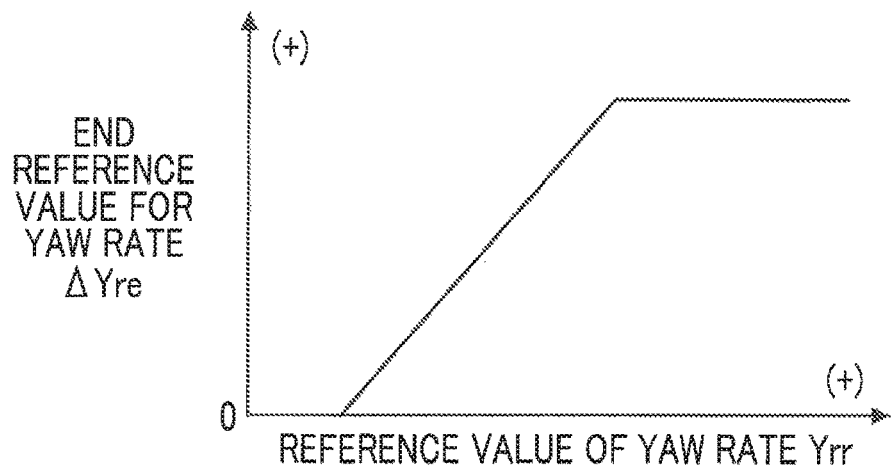
FIG. 10 is a map which is used to calculate an end reference value $\Delta Yre$ for a yaw rate based on a reference value Yrr of the yaw rate.
Figure 11:
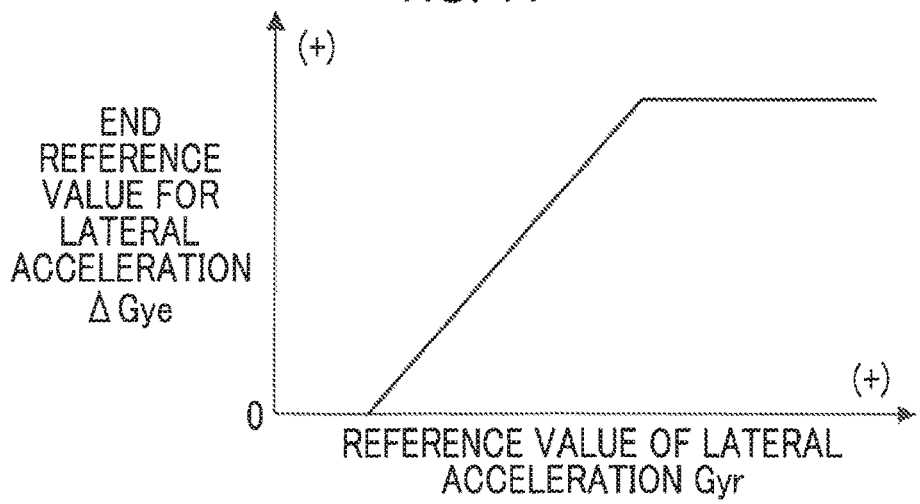
FIG. 11 is a map which is used to calculate an end reference value $\Delta Gye$ for a lateral acceleration based on a reference value Gyr of the lateral acceleration.

In Step 140, an end reference value ΔYre of the yaw rate is calculated with reference to the map illustrated in FIG. 10 based on the reference value Yrr of the yaw rate. An end reference value ΔGye of the lateral acceleration is calculated with reference to the map illustrated in FIG. 11 based on the reference value Gyr of the lateral acceleration. When the following conditions (I) and (J) are satisfied, it is determined that the end conditions are satisfied. In Step 50, Condition (I) may be omitted when Condition (A) is omitted, or Condition (J) may be omitted when Condition (B) is omitted. (I) A difference ΔYrr between the absolute value of the reference value Yrr of the yaw rate and the absolute value of the actual yaw rate Yr is equal to or greater than the end reference value ΔYre of the yaw rate. (J) A difference ΔGyr between the absolute value of the reference value Gyr of the lateral acceleration and the absolute value of the actual lateral acceleration Gy is equal to or greater than the end reference value ΔGye of the lateral acceleration.

Figure 6:
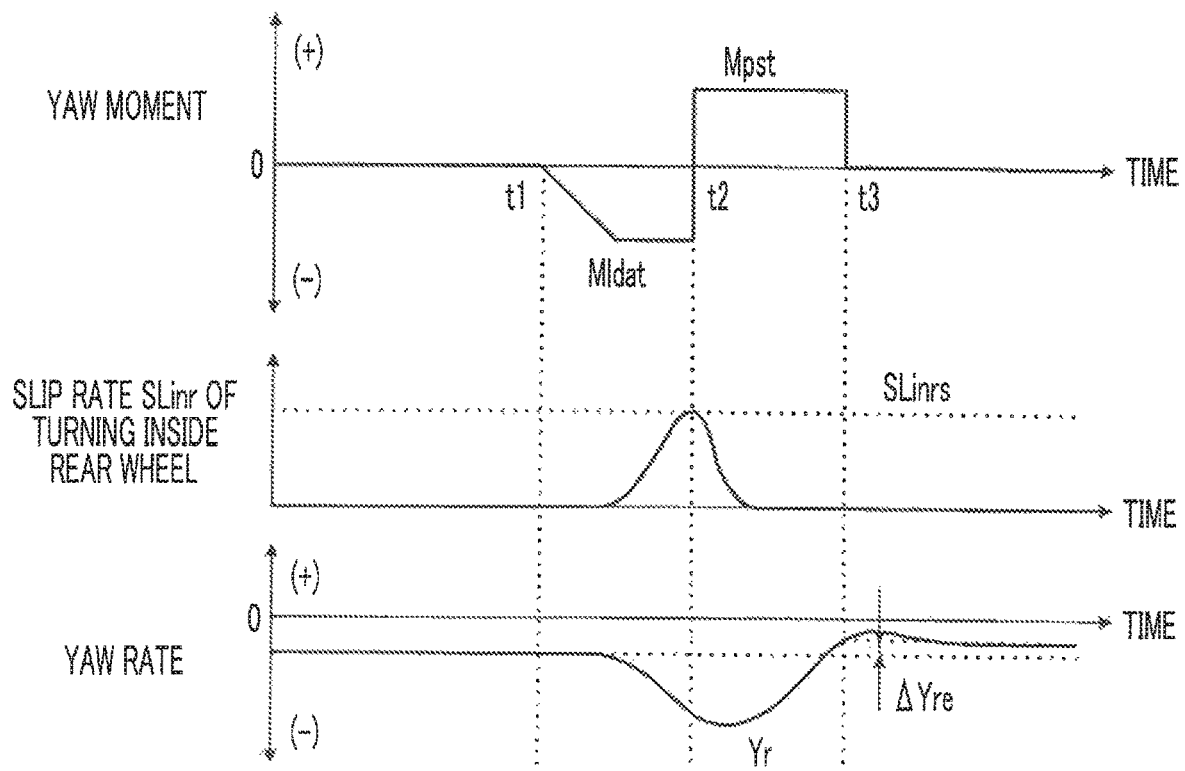
FIG. 6 is a timing chart illustrating an example of operations in a second embodiment.

As illustrated in FIG. 6, similarly to the first embodiment, the lane departure prevention yaw moment Mlda is applied to the vehicle 18 from time t1 to time t2, and the spin prevention yaw moment Mps is applied to the vehicle 18 from time t2 to just before time t3. At time t3, the difference between the absolute value of the reference value Yrr of the yaw rate and the absolute value of the actual yaw rate Yr is equal to or greater than the end reference value ΔYre of the yaw rate and the spin prevention yaw moment Mps is not applied to the vehicle 18.

Third Embodiment

In a third embodiment, the lane departure prevention control is performed in the same way as in the first embodiment in accordance with the flowcharts illustrated in FIGS. 2 and 3 except for Steps 100 and 140.

Figure 12:
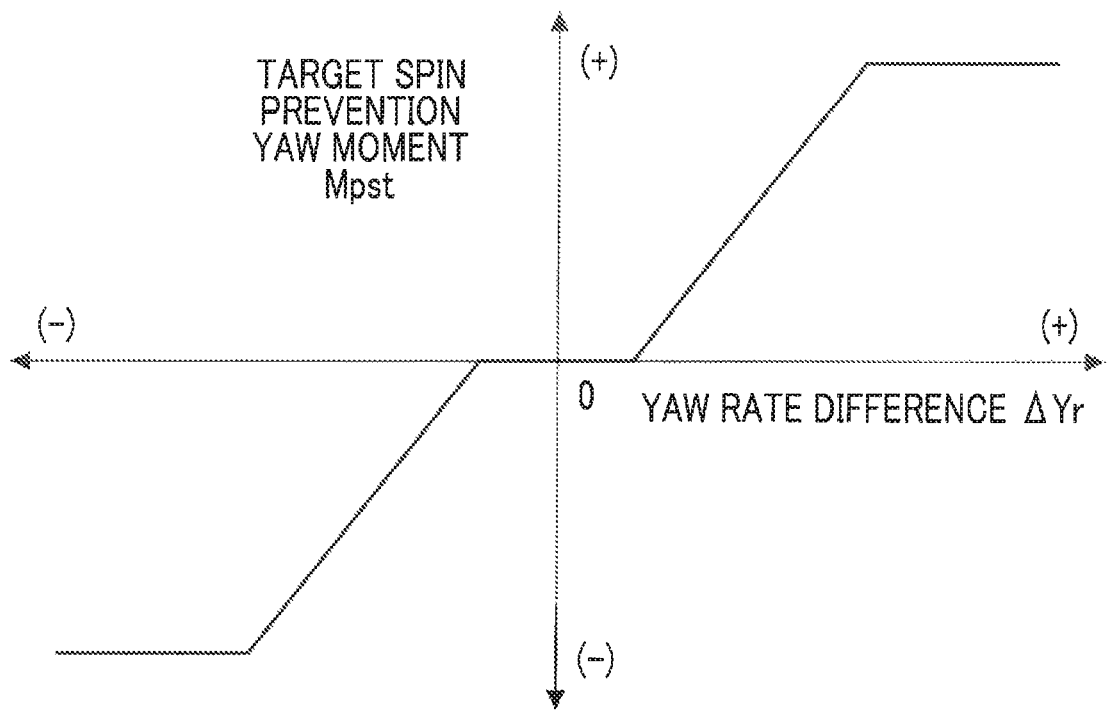
FIG. 12 is a map which is used to calculate a target spin prevention yaw moment Mpst based on a difference $\Delta Yr$ (=Yrnf−Yr) between a target yaw rate Yrnf and an actual yaw rate Yr.

In Step 100 in the third embodiment, the target yaw rate Yrnf is calculated by Equation (2) or (4). The target spin prevention yaw moment Mpst is calculated with reference to the map illustrated in FIG. 12 based on the difference ΔYr (=Yrnf−Yr) between the target yaw rate Yrnf and the actual yaw rate Yr. Similar to the first and second embodiments, the phase-compensated normative yaw rate Yrvcf of the vehicle and the phase-compensated normative lateral acceleration Gyvcf of the vehicle are also calculated.

In Step 140, for example, when all the above-mentioned conditions (G) and (H) and the following condition (K) are satisfied, it may be determined that the end conditions are satisfied. Condition (G) may be omitted when Condition (A) is omitted, or Condition (H) may be omitted when Condition (B) is omitted. (K) The difference ΔYrn between the absolute value of the target yaw rate Yrnf and the absolute value of the actual yaw rate Yr is equal to or greater than a reference value ΔYrn0 (a constant equal to or greater than 0).

Figure 13:
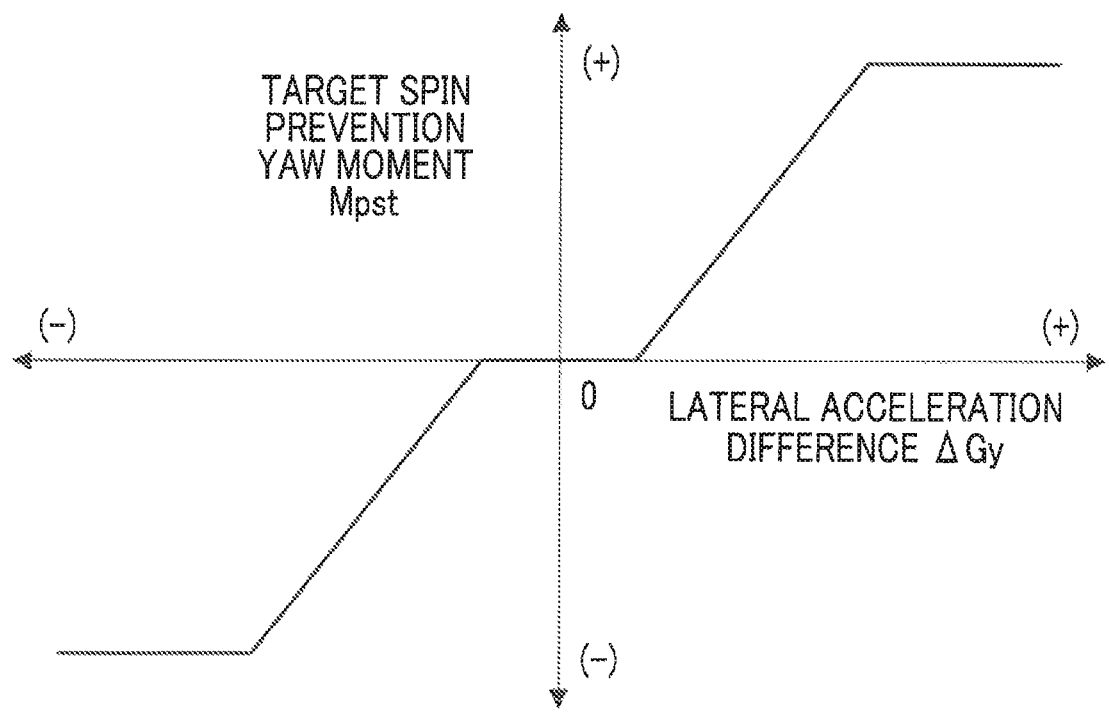
FIG. 13 is a map which is used to calculate a target spin prevention yaw moment Mpst based on a difference $\Delta Gy$ (=Gynf−Gy) between a target lateral acceleration Gynf and an actual lateral acceleration Gy.

The target spin prevention yaw moment Mpst may be calculated based on the lateral acceleration of the vehicle. In this case, the target lateral acceleration Gynf is calculated by Equation (6). The target spin prevention yaw moment Mpst is calculated with reference to the map illustrated in FIG. 13 based on the difference ΔGy (=Gynf−Gy) between the target lateral acceleration Gynf and the actual lateral acceleration Gy.

In Step 140, for example, when all the above-mentioned conditions (G) and (H) and the following condition (L) are satisfied, it may be determined that the end conditions are satisfied. Condition (G) may be omitted when Condition (A) is omitted, or Condition (H) may be omitted when Condition (B) is omitted. (L) The difference ΔGyn between the absolute value of the target lateral acceleration Gynf and the absolute value of the actual lateral acceleration Gy is equal to or greater than a reference value ΔGyn0 (a constant equal to or greater than 0).

Figure 7:
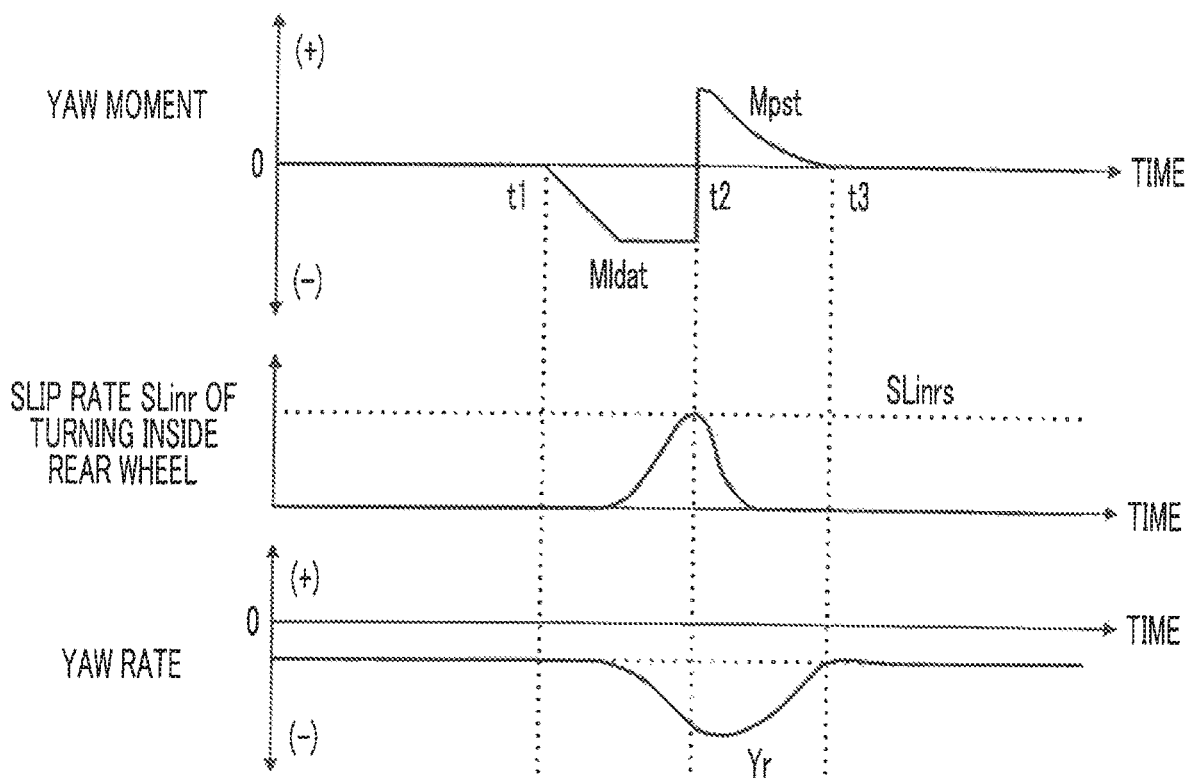
FIG. 7 is a timing chart illustrating an example of operations in a third embodiment.

As illustrated in FIG. 7, similarly to the first and second embodiments, the yaw moment Mlda is applied to the vehicle 18 from time t1 to time t2, and the yaw moment Mps is applied to the vehicle 18 from time t2 to just before time t3. Since the target yaw moment Mpst is calculated based on the difference ΔYr between the target yaw rate Yrnf and the actual yaw rate Yr, the magnitude of the target yaw moment Mpst decreases gradually. At time t3, the target yaw moment Mpst is zero and the yaw moment Mps is not applied to the vehicle 18.

As can be seen from the above description, according to the second and third embodiments, the same operational advantages as in the first embodiment are obtained. That is, when there is a likelihood that the vehicle 18 will depart from the lane to the turning outside, the yaw moment Mlda for preventing the vehicle from departing from the lane to the turning outside is applied to the vehicle and thus the likelihood that the vehicle 18 will depart from the lane to the turning outside is reduced. When there is a likelihood that the vehicle will enter the spinning state in a situation in which the yaw moment Mlda is applied to the vehicle, application of the yaw moment Mlda is stopped and the yaw moment Mps for preventing the vehicle from entering the spinning state is applied to the vehicle. Accordingly, it is possible to prevent the vehicle 18 from entering the spinning state due to the lane departure prevention yaw moment Mlda using the spin prevention yaw moment Mps without depending on the spin control of the behavior control.

According to the first to third embodiments, when it is determined in Step 50 that there is a likelihood that the vehicle will enter the spinning state, the braking threes are applied to the turning outside front and rear wheels such that the spin prevention yaw moment Mps corresponding to the target spin prevention yaw moment Mpst is applied to the vehicle 18 in Step 120. Accordingly, it is possible to apply the spin prevention yaw moment Mps to the vehicle without determining which of the magnitudes of the target lane departure prevention yaw moment Mldat and the target spin prevention yaw moment Mpst is larger. Accordingly, even when the magnitude of the target spin prevention yaw moment Mpst is smaller than the magnitude of the target lane departure prevention yaw moment Mldat, it is possible to satisfactorily apply the spin prevention yaw moment to the vehicle.

According to the first to third embodiments, in Step 50, when any one of Conditions (A) to (D) is satisfied, it is determined that there is a likelihood that the vehicle 18 will enter the spinning state. Accordingly, in comparison with a case in which the determination of whether there is a likelihood that the vehicle will enter the spinning state in a situation in which the vehicle is likely to enter the spinning state is performed, for example, based on only any one of Conditions (A) to (D), it is possible to reduce a possibility that it will be not determined that there is a likelihood that the vehicle will enter a spinning state even if the vehicle is likely to enter the spinning state.

Particularly, according to the second embodiment, when the difference $\Delta$Yrr between the absolute value of the reference value of the yaw rate Yrr and the absolute value of the actual yaw rate Yr is equal to or greater than the end reference value $\Delta$Yre of the yaw rate, it is determined that the predetermined end conditions are satisfied. Accordingly, the spin prevention yaw moment Mps can be applied to the vehicle until the difference $\Delta$Yrr of the absolute value of the yaw rate is equal to or greater than the end reference value $\Delta$Yre of the yaw rate.

According to the third embodiment, the target spin prevention yaw moment Mpst is calculated based on the difference $\Delta$Yr between the target yaw rate Yrnf and the actual yaw rate Yr. Accordingly, it is possible to control the spin prevention yaw moment Mps depending on the difference $\Delta$ of the yaw rate.

While specific embodiments of the disclosure have been described above in detail, the disclosure is not limited to the above-mentioned embodiments but can be embodied in various other embodiments within the scope of the disclosure, which will be apparent to those skilled in the art.

For example, in the above-mentioned embodiments, in Step 50, when any one of Conditions (A) to (D) is satisfied, it is determined that there is a likelihood that the vehicle 18 will enter the spinning state. The following conditions (E) and (F) may be added in addition to Conditions (A) to (D) and it may be determined that there is a likelihood that the vehicle 18 will enter the spinning state when any one of Conditions (A) to (F) is satisfied. In this case, one of Conditions (E) and (F) may be omitted. (E) The phase-compensated normative yaw rate Yrvcf of the vehicle is calculated by Equation (14) and the absolute value of the difference between the rate of change of the phase-compensated normative yaw rate Yrvcf and the rate of change of the actual yaw rate Yr is greater than the reference value Yrsd (a positive constant). (F) The phase-compensated normative lateral acceleration Gyvcf of the vehicle is calculated by Equation (15) and the absolute value of the difference between the rate of change of the phase-compensated normative lateral acceleration Gyvcf and the rate of change of the actual lateral acceleration Gy is greater than the reference value Gysd (a positive constant).

In the above-mentioned embodiments, when the turning state quantity which is used to determine whether there is a likelihood that the vehicle will enter the spinning state is the yaw rate, the phase-compensated normative yaw rate Yrvcf of the vehicle is calculated as the normative turning state quantity of the vehicle by Equation (14). However, the phase-compensated normative yaw rate Yrvcf of the vehicle may be a sum of the phase-compensated normative yaw rate Yrnf and the phase-compensated normative yaw rate $Yr_{LDA}f$ which are respectively calculated by Equations (2) and (9). The phase-compensated normative yaw rate Yrvcf may be a sum of the phase-compensated normative yaw rate Yrnf and the phase-compensated normative yaw rate $Yr_{LDA}f$ which are respectively calculated by Equations (4) and (9).

In the above-mentioned embodiments, when the turning state quantity which is used to determine whether there is a likelihood that the vehicle will enter the spinning state is the lateral acceleration, the phase-compensated normative lateral acceleration Gyvcf of the vehicle is calculated as the normative turning state quantity of the vehicle by Equation (15). However, the phase-compensated normative lateral acceleration Gyvcf of the vehicle may be a sum of the phase-compensated normative lateral acceleration Gynf and the phase-compensated normative lateral acceleration $Gy_{LDA}f$ of the vehicle which are respectively calculated by Equations (6) and (10).

In the above-mentioned embodiments, Condition (D) which is used to determine whether there is a likelihood that the vehicle will enter the spinning state in Step 50 is a condition for determining whether there is a likelihood that the vehicle will enter the spinning state by determining where there is a likelihood that behavior of the vehicle will be destabilized. However, in addition to determination of the braking slip rates SLinf and SLinr, for example, determination of whether the vehicle is likely to enter the spinning state based on the relationship between the normative state quantity and the actual state quantity may be added to Condition (D). On the other hand, the braking slip rate SLinf of the turning inside front wheel may be omitted from Condition (D), and Condition (D) may be a condition including only the braking slip rate SLinr of the turning inside rear wheel.

In the above-mentioned embodiments, the behavior control, that is, the spin control and the drift-out control, is performed in accordance with the flowchart illustrated in FIG. 4. However, the lane departure prevention system according to the disclosure may be applied to a vehicle in which behavior control is not performed. In this case, Steps 100 and 130 in the lane departure prevention control routine illustrated in FIG. 2 are omitted.

In the above-mentioned third embodiment, it is determined that the end conditions are satisfied when all of Conditions (G) and (H) and Condition (K) are satisfied or when all of Conditions (G) and (H) and Condition (L) are satisfied. However, the determination of the end conditions in the third embodiment may be same as the determination of the end conditions in the second embodiment.

In the above-mentioned embodiments, the normative turning state quantity of the vehicle which is used to determine whether there is a likelihood that the vehicle will enter the spinning state is the phase-compensated normative turning state quantity of the vehicle, but may be a non-phase-compensated normative turning state quantity of the vehicle.

What is claimed is:

1. A lane departure prevention system of a vehicle, comprising:
    a detection sensor configured to detect a positional relationship of the vehicle relative to a lane;
    an actuator; and
    at least one electronic control unit configured to control a braking force of vehicle wheels by driving the actuator such that a lane departure prevention yaw moment in a direction in which departure from the lane is prevented is applied to the vehicle when it is determined that there is a likelihood that the vehicle departs from the lane based on a detection result of the detection sensor, the at least one electronic control unit being configured to
        determine whether there is a likelihood that the vehicle enters a spinning state based on at least one of a difference between an actual turning state quantity and a normative turning state quantity of the vehicle and a degree of braking slip of a turning inside wheel when the lane departure prevention yaw moment is a yaw moment for preventing departure of the vehicle from the lane and a braking force is applied to the turning inside wheel, the normative turning state quantity being calculated based on a steering angle, a vehicle speed, and the lane departure prevention yaw moment,
        apply a spin prevention yaw moment, instead of the lane departure prevention yaw moment, to the vehicle by applying a braking force to a turning outside wheel until a predetermined end condition is satisfied when it is determined that there is the likelihood that the vehicle enters the spinning state,
        calculate a target lane departure prevention yaw moment for preventing the vehicle from departing from the lane to a turning outside when it is determined that there is the likelihood that the vehicle departs from the lane to the turning outside,
        calculate a target spin prevention yaw moment for preventing the vehicle from entering the spinning state when it is determined that there is the likelihood that the vehicle enters the spinning state, and
        control the spin prevention yaw moment based on the target spin prevention yaw moment without determining which magnitude of the target lane departure prevention yaw moment and the target spin prevention yaw moment is greater.

2. The lane departure prevention system according to claim 1, wherein
    the at least one electronic control unit is configured to determine a magnitude of the target spin prevention yaw moment based on the magnitude of the target lane departure prevention yaw moment at a time point at which a determination result that there is no likelihood that the vehicle enters the spinning state is changed to a determination result that there is the likelihood that the vehicle enters the spinning state.

3. The lane departure prevention system according to claim 1, wherein
    the at least one electronic control unit is configured to:
        calculate a target yaw rate of the vehicle based on the steering angle and the vehicle speed; and
        calculate the target spin prevention yaw moment based on a difference between the target yaw rate and an actual yaw rate detected by a yaw rate sensor mounted in the vehicle.

4. The lane departure prevention system according to claim 1, wherein
    the at least one electronic control unit is configured to:
        calculate a target lateral acceleration of the vehicle based on the steering angle and the vehicle speed; and
        calculate the target spin prevention yaw moment based on a difference between the target lateral acceleration and an actual lateral acceleration detected by a lateral acceleration sensor mounted in the vehicle.

5. The lane departure prevention system according to claim 1, wherein
    the at least one electronic control unit is configured to:
        calculate a target yaw rate of the vehicle based on the steering angle and the vehicle speed; and
        determine that the predetermined end condition is satisfied when a magnitude of an actual yaw rate detected by a yaw rate sensor mounted in the vehicle is equal to or less than the magnitude of the target yaw rate.

6. The lane departure prevention system according to claim 1, wherein
    the at least one electronic control unit is configured to:
        calculate a target lateral acceleration of the vehicle based on the steering angle and the vehicle speed; and
        determine that the predetermined end condition is satisfied when a magnitude of an actual lateral acceleration detected by a lateral acceleration sensor mounted in the vehicle is equal to or less than the magnitude of the target lateral acceleration.

7. The lane departure prevention system according to claim 1, wherein
    the at least one electronic control unit is configured to:
        calculate a target yaw rate of the vehicle based on the steering angle and the vehicle speed;
        set the target yaw rate at a time point at which a determination result that there is no likelihood that the vehicle enters the spinning state is changed to a determination result that there is the likelihood that the vehicle enters the spinning state as a reference value of a yaw rate; and
        determine that the predetermined end condition is satisfied when a difference between a magnitude of the reference value of the yaw rate and a magnitude of an actual yaw rate detected by a yaw rate sensor mounted in the vehicle is equal to or greater than an end reference value of the target yaw rate.

8. The lane departure prevention system according to claim 1, wherein
    the at least one electronic control unit is configured to:
        calculate a target lateral acceleration of the vehicle based on the steering angle and the vehicle speed;
        set the target lateral acceleration at a time point at which a determination result that there is no likelihood that the vehicle enters the spinning state is changed to a determination result that there is the likelihood that the vehicle enters the spinning state as a reference value of a lateral acceleration; and determine that the predetermined end condition is satisfied when a difference between a magnitude of the reference value of the lateral acceleration and a magnitude of an actual lateral acceleration detected by a lateral acceleration sensor mounted in the vehicle is equal to or greater than an end reference value of the lateral acceleration.

9. The lane departure prevention system according to claim 1, wherein
the at least one electronic control unit is configured to use a phase-compensated normative turning state quantity as the normative turning state quantity of the vehicle.

* * * * *